(12) United States Patent
Randle et al.

(10) Patent No.: US 8,719,562 B2
(45) Date of Patent: May 6, 2014

(54) SECURE SERVICE NETWORK AND USER GATEWAY

(76) Inventors: William M. Randle, Bexley, OH (US); Randall E. Orkis, Pataskala, OH (US)

(*) Notice: Subject to any disclaimer, the term of this patent is extended or adjusted under 35 U.S.C. 154(b) by 1410 days.

(21) Appl. No.: 10/967,991

(22) Filed: Oct. 19, 2004

(65) Prior Publication Data

US 2006/0107036 A1 May 18, 2006

Related U.S. Application Data

(63) Continuation-in-part of application No. 10/459,694, filed on Jun. 11, 2003, now Pat. No. 7,568,222, and a continuation-in-part of application No. 10/283,038, filed on Oct. 25, 2002, now Pat. No. 7,565,326.

(51) Int. Cl.
*H04L 29/06* (2006.01)

(52) U.S. Cl.
USPC .................. 713/153; 726/5; 705/59; 709/238

(58) Field of Classification Search
USPC .................. 713/153; 726/6; 705/79; 709/238
See application file for complete search history.

(56) References Cited

U.S. PATENT DOCUMENTS

| | | | | |
|---|---|---|---|---|
| 5,548,649 | A * | 8/1996 | Jacobson ...................... | 713/153 |
| 6,108,330 | A * | 8/2000 | Bhatia et al. .................. | 370/352 |
| 6,154,839 | A * | 11/2000 | Arrow et al. .................. | 713/154 |
| 6,684,331 | B1 * | 1/2004 | Srivastava ..................... | 713/163 |
| 6,820,204 | B1 * | 11/2004 | Desai et al. ........................ | 726/6 |
| 6,823,462 | B1 * | 11/2004 | Cheng et al. ..................... | 726/15 |
| 6,850,495 | B1 * | 2/2005 | Baum et al. ..................... | 370/256 |
| 6,895,234 | B1 * | 5/2005 | Laursen et al. ................ | 455/403 |
| 6,965,816 | B2 * | 11/2005 | Walker .............................. | 701/16 |
| 7,042,988 | B2 * | 5/2006 | Juitt et al. .................... | 379/88.17 |
| 7,127,741 | B2 * | 10/2006 | Bandini et al. .................. | 726/14 |
| 7,167,844 | B1 * | 1/2007 | Leong et al. ..................... | 705/80 |
| 7,191,331 | B2 * | 3/2007 | Maufer et al. ................. | 713/153 |
| 7,287,271 | B1 * | 10/2007 | Riggins ............................. | 726/3 |
| 7,383,433 | B2 * | 6/2008 | Yeager et al. ................. | 713/157 |
| 7,568,222 | B2 | 7/2009 | Randle et al. | |
| 7,849,140 | B2 * | 12/2010 | Abdel-Aziz et al. .......... | 709/206 |
| 2002/0026582 | A1 * | 2/2002 | Futamura et al. ............. | 713/170 |
| 2003/0046391 | A1 * | 3/2003 | Moreh et al. ................... | 709/225 |
| 2003/0105812 | A1 * | 6/2003 | Flowers et al. ............... | 709/203 |
| 2003/0120948 | A1 * | 6/2003 | Schmidt et al. ............... | 713/200 |
| 2003/0200172 | A1 | 10/2003 | Randle et al. | |
| 2004/0039905 | A1 * | 2/2004 | Leoutsarakos ................ | 713/153 |
| 2005/0071283 | A1 | 3/2005 | Randle et al. | |
| 2006/0015450 | A1 | 1/2006 | Guck et al. | |

OTHER PUBLICATIONS

Excerpts from the decision in: In the matter, Wells Fargo Bank, N.A., Claimant, and Data Treasury Corporation and, WMR e-Pin LLC, e-Banc, LLC, and Synoran, AAA No. 65 117 00005 07 delivered on Jul. 21, 2008.

* cited by examiner

*Primary Examiner* — Amare F Tabor
(74) *Attorney, Agent, or Firm* — Porter Wright Morris & Arthur, LLP

(57) ABSTRACT

A secure service network (SSN) comprising an IP network infrastructure wherein the access of one participant to another participant in the network is controlled by a secure service gateway (SSG) in which a point of origination universal identifier (PoUID) represents a unique identifier for the participant within a participant's internal network domain and the interconnection of the SSGs within the SSN as a precondition of access creates a bilaterally secure peer to peer service connection. Participants in the network are service providers, service requesters, or both. A global secure service gateway (GSSG) may be interconnected in the SSN to provide a central access authority and management services.

18 Claims, 16 Drawing Sheets

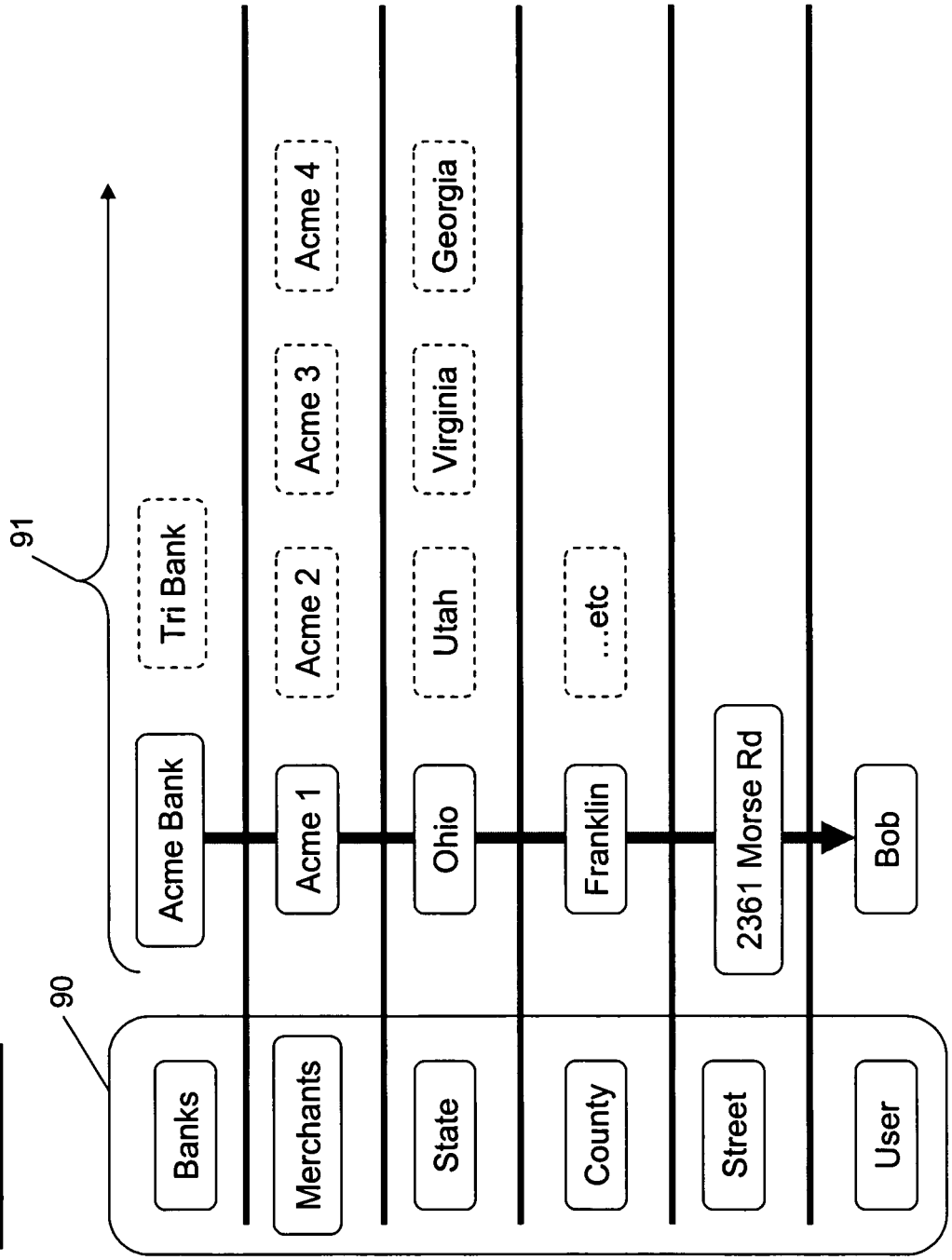

SECURE SERVICE NETWORK AND USER GATEWAY

RELATED APPLICATIONS

This application is a continuation-in-part of application Ser. No. 10/459,694, filed on Jun. 11, 2003, Standardized Transmission and Exchange of Data with Security and Non-Repudiation Functions, now U.S. Pat. No. 7,568,222, issued Jul. 28, 2009; and a continuation-in-part of application Ser. No. 10/283,038, filed on Oct. 25, 2002, Dialect Independent Multi Dimensional Integrator Using a Normalized Language Platform and Secure Controlled Access, filed on Oct. 25, 2002, now U.S. Pat. No. 7,565,326 issued Jul. 21, 2009; each of which are herein incorporated by reference.

FIELD OF THE INVENTION

The present invention relates to a secure electronic information exchange network using a service infrastructure with a participant gateway that provides private bilateral security between participants following authentication, authorization and encryption administered through individual, and optionally, a global gateway, that processes unique participant identifiers associated with a participant and/or a domain.

BACKGROUND OF THE INVENTION

Potentially accessible information is produced in the digital world at an ever increasing volume. Problems in the ability to deliver digital information securely to the right place, at the right time, and at an affordable price inhibit the utility and diminish the value of information for viewing and processing purposes. There is a need for businesses and their customers to access information in near real-time from any location on the globe in a secure, private, and cost effective manner.

The standards, technologies, and resulting network infrastructure presented by the Internet have established the value of sharing information and demonstrated the effect that a common infrastructure can have in driving low cost information sharing in a network environment. The Internet does this in a loose governance model where security, reliability, privacy, and enforcement are insufficient to assure the ability to confidently share mission critical or high value data. There is a need for an Internet like network implementation where the benefits of the Internet such as low cost, flexibility, reach, shared access and use, user control, multi-functionality, and the like can be accomplished. Current drawbacks of the Internet include, inter alia, the lack of quality of service, rouge user attacks (hackers), the absence of standards for global authentication and authorization, the lack of service level enforcement and tools for governance, the lack of standard application implementation and reporting, and the lack of assured delivery and status reporting. As a result, there is a need for an Internet like network solution that provides the benefits of the Internet such as flexibility, dynamics, and end user controllability, without the foregoing drawbacks.

Information sharing relationships can generally categorized as one-to-one, one-to-many, or many-to-many. Information sharing participants may have one or many of such relationships whether the participant is sharing information as an individual or a business. As such, each participant desires to maintain the confidentiality of relationships whether the relationships are driven by personal or business motives. In addition, all participants desire to exchange information in a secure and reliable manner. Traditional information and application sharing methods, such as dedicated high cost point-to-point network connections or industry-specific communities, have proven to be technically complex, have limited functionality, have limited reach, and are cost prohibitive for many applications. Point-to-point connections work well for a small set of isolated relationships, but as the number of relationships and interconnections increase, a point-to-point approach becomes too complex and inflexible to be practical. Industry specific communities typically provide a limited ability to reach outside the boundaries of a specific industry. The secure service implementation described herein as used on a common low cost network infrastructure could provide significant business value. Such a design will lower the participation cost for all parties while allowing a participant to consume services on an as needed basis. In addition, service providers can publish services for consumption by users as defined by the service provider independent of a dedicated network community or consortium.

Policy-based management is an existing approach used in an enterprise or network. Policies are operating rules established for situations that are likely to occur, such as for controlling access and establishing priorities for the use of resources. Unlike point-to-point management where security devices are configured one by one across the network to attain an appropriate security level, policy-based management closely follows business practices and requirements by establishing rules and relations among and between network entities. An entity defines policies for connections, access and applications accessible in the network. Policies are rules, independent of brand or function, propagated across devices, infrastructure or participant communities. Administrators do not need to know the specific language of any particular brand of equipment to set security rules according to business practices.

Current policy implementations must be set with firewalls in mind. Firewalls are hardware or software security implementations that provide a user with a protected network control by securing traffic at the network level, commonly referred to as the Internet Protocol (IP) stack. Firewalls are commonly used to provide a secure transition to the Internet, to separate an organization's public servers from the rest of the network, and to maintain individual network segments isolated and secure from one another. Firewalls can employ several techniques in combination to provide protection: basic packet filtering based on an IP address and/or port numbers (essentially a routing function), proxy or application-level servers that close the direct path between networks, network address translation (often used in proxy servers), content filtering, and DoS detection. These features are native to any modern day IP network implementation.

Firewalls traditionally enforce security at the data packet level within the network IP stack, namely, the firewall has little or no knowledge of the application or data content, or of the participants, except that participants are an anonymous user on an IP based network. As a result, all security related to authentication and authorization as well as reporting and logging are left to the end user or application developer for design and implementation. This results in an inconsistent implementation that does not easily and reliably support a trusted user community—let alone private user communities on a common network infrastructure. There is thus a need to establish a common service infrastructure that supports a higher level of commonality on a standard IP network. This higher level of commonality is focused on addressing the shortfalls in the current Internet model so that any to any secure and reliable connectivity can be accomplished in a cost effective and unrestrictive fashion.

A virtual private network (VPN) is a secure method of accessing a private network using a public network, such as the Internet. A remote user or network connects to a local Internet service provider (ISP), and then accesses a central site through a secure VPN mechanism. VPN's use data encryption to ensure that the data is secure from snooping. A VPN implementation can result in significant cost savings when compared to the expense of leased lines or dial-up connections for remote users. VPN security means are typically transient, existing only for the duration of the information exchange, and establish a virtual circuit across the Internet by encapsulating the original IP packets within specially secured IP packets.

A firewall can allow VPN traffic to pass back and forth; some firewalls are able to initiate and terminate VPN tunnels. This allows multiple PCs on a LAN to share the same VPN tunnel, and can speed up the performance of the VPN tunnel if the firewall uses hardware to encrypt the data. VPN tunneling protocols enable encapsulation of various protocols over an IP network and typically require authentication, authorization, and/or encryption. Content filtering can be included as part of a firewall or other security device. Content filtering limits a user's web site access by associating a restriction policy with a specific URL, IP address, or topic category. Content filtering can utilize a database containing a comprehensive list of elements to be blocked by limiting access to data associated with a specific IP address.

Authentication methods are used in most environments, such as face-to-face activities, over the phone, and/or Internet transactions. Current authentication technologies and techniques use a static design structure that is difficult to change and/or enhance. A typical authentication protocol involves a hub and spoke design and may violate privacy legislation dictates. Current authentication techniques involve a high participation cost because of the equipment, connectivity, and other requirements and provide only a single offering solution. Many authentication techniques require unique network requirements for each application or service offering.

To access a domain, a user must be authenticated and authorized to see that domain; a network participant must be a member of the domain or be in a trust relationship to the domain. To access resources on another domain, one domain sets up a trust relationship with the other domain. Two types of trust relationships exist: one-way trusts and bidirectional trusts. A trust relationship allows a participant to access another domain as though it is part of the participant's domain. Trust relationships often support coarse grained partitioning of rights and privileges. For example a domain may include all servers associated with a specific business unit such as human resources (HR). As a result of being an authorized member of the HR network domain, a participant/user can see all the HR computers that are part of that domain; however, it is likely that the applications on the servers will require user authentication and authorization at each application to access any data the applications may provide. This means that a user needs a user ID and password for each application in the domain. As the domain and the number of applications grow, the need to remember and manage a great number of user ID and password credentials may become overwhelming. Access control is a method of allowing and disallowing certain operations on a network or in an application. Access control may be implemented by access control lists (ACL). Access control typically supports finer grained domain partitioning allowing domain requestors to be authorized to perform a limited set of activities that may be available in a given domain.

Although many of these individual technologies exist, no solution is sufficiently adaptable to provide a secure service network offering that addresses the shortcomings, while maintaining the benefits of, the Internet. No known solution allows a service network capable of sharing sensitive information between and among participants in real time using a shared IP infrastructure. The benefit of a secured service network environment is significant in that the security available in a secure service network would support information sharing in a manner not currently available.

BRIEF SUMMARY OF THE INVENTION

The present invention is a secure service network (SSN) that provides a solution and process framework that rapidly and simply establishes trusted, authorized, private and encrypted connections among a diverse group of participants on new or existing IP based network infrastructure. The system of the invention represents a shared multi-function service network (SMFSN) and service infrastructure capable of supporting a broad range of secure and private activities on any private or public IP infrastructure. The present invention provides a SMFSN by leveraging or adding a service layer on top of an existing or new IP network infrastructure to provide a secure implementation of services across trusted and untrusted network connections. The service layer includes full encryption, authentication, authorization and participant privacy. The present invention establishes a SSN solution and process model that allows the network provider to address the shortcomings of the Internet while maintaining its many advantages. Advantages include low cost, low complexity, flexibility, user friendliness and controllability; secure service over a common network infrastructure results in a lower cost of ownership for all users. Users include the data provider, the data requestor and the network provider. Current approaches that include application specific and point to point networks are limited in functionally, participant reach, and flexibility and result in a higher cost of ownership than a comparable SSN implementation.

The present invention includes an infrastructure that establishes a secure service network that includes full authorization and authentication support, which can be enforced at either the enterprise or local level, thereby delivering control of access to data and services to the owner of the data and/or to a central governance body. Network security comprises encryption, privacy, authentication, service access authorization, local service access control, and privilege revocation. The present invention supports one to one relationships, one to many relationships, many to many relationships, and real time, batch, inquire, and update functions, quality of service prioritization, and enterprise and end point managed security. The invention establishes a framework and process model for the implementation of a secure service network to address secure, private any to any communication.

The present invention provides value oriented service offerings in a technical design that provides for simplified expansion of the service offerings. The system offers transition from fixed point to point application specific EDI solutions to a shared secure service network with services for customers, suppliers, and or partners on a common infrastructure. The system includes a common framework for business infrastructure and reporting, governance, audit, security, and billing. The system of the invention offers the benefit of real time sharing of information between and among participants, in which the owner of the information maintains unique capabilities and control over the information, the consumer of the information draws upon the information directly related to information value, and the deliverer of the Information receives value added functionality at a lower cost. The SSN represents an implementation by Synoran LLC, Columbus, Ohio, of a shared multi-function service network (SMFSN). The SSN expands the SMFSN description by detailing process flows for multiple governance models as well as flexible security implementation and service descriptors. In earlier shared multi-function service network descriptions, the Global Secure Services Gateway (GSSG) has been referred to as the "Super Node" and the Secure Service Gateway (SSG) has been generally referred to as the "Integration Node." The present invention supports multiple service definitions across any number of service domains; user domains are defined in a manner to restrict knowledge of participants to a given domain of users. A domain establishes a community of users with common trust relationships; a user is provided the capability to protect the privacy of participants without requiring a separate dedicated network. As a result, a participant can define an infinite number of domains. Users may be aware of domain members but may not be aware of the services that each member can access unless the provider of the services shares this information. In this manner, a service provider on the network can publish a service for one or many users in a given domain. Domains can be comprised of parent child relationships such that some services and participants can be in global domains—while others are in subsets of a global domain. Domains support the business development of contractual relationships for a set of users and any number of services, for example, only participants defined as part of a domain access services for that domain. Services are then only available to domain members that are defined in an access control list (ACL). One domain can not see participants or services for other domains; ACLs are typically used to authorize a participant's access to a service within a domain.

The invention is described more fully in the following description of the preferred embodiment, considered in view of the drawings in which:

BRIEF DESCRIPTION OF THE SEVERAL VIEWS OF THE DRAWINGS

FIG. 9A, FIG. 9B and FIG. 9C depict sample domain and ACL tree hierarchies that can be implemented as part of authentication and/or authorization protocols in the SSN.

DETAILED DESCRIPTION OF THE INVENTION

Figure 1A:
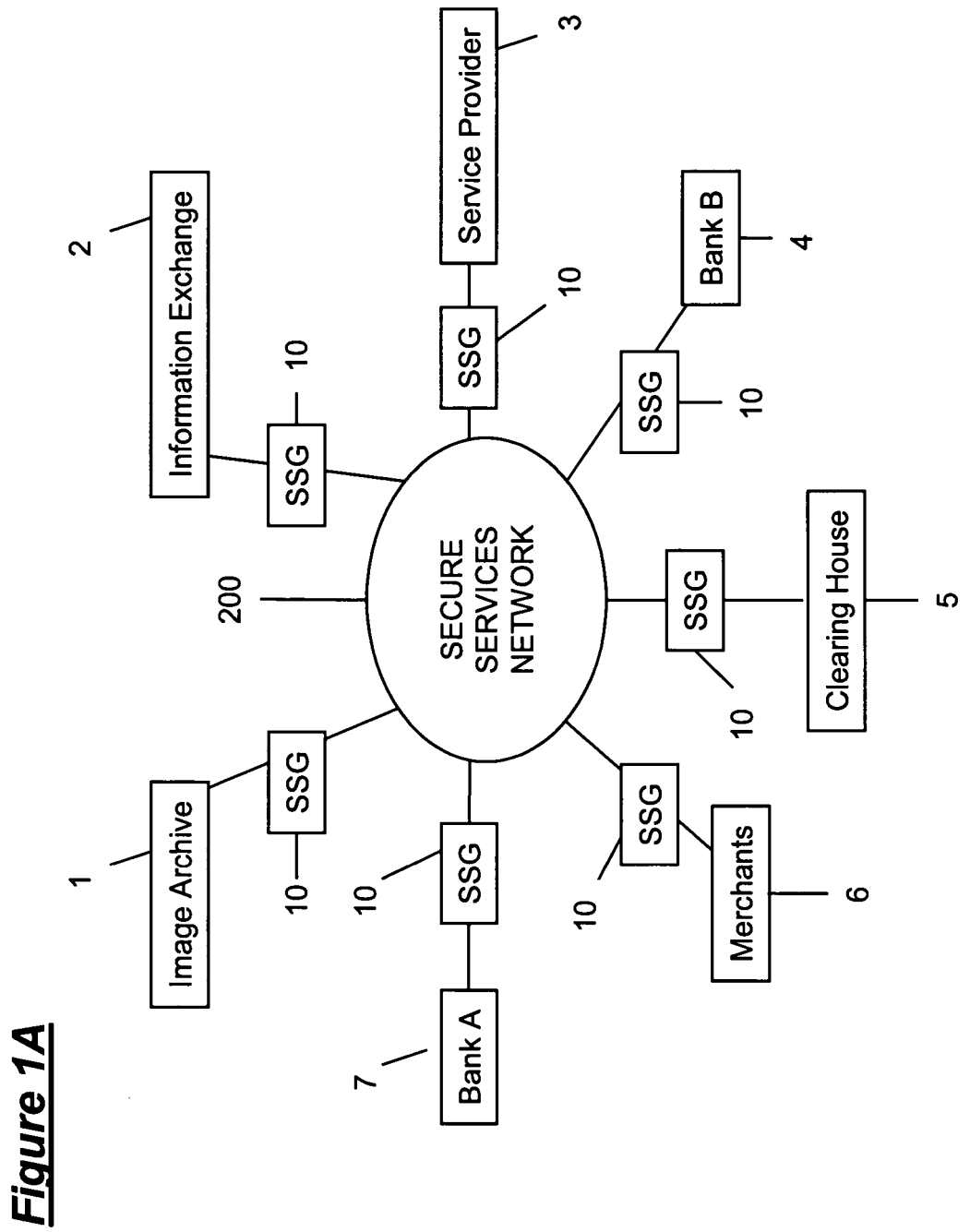
FIG. 1A, FIG. 1B and FIG. 1C show the general infrastructure of a secure service network.
Figure 1C:
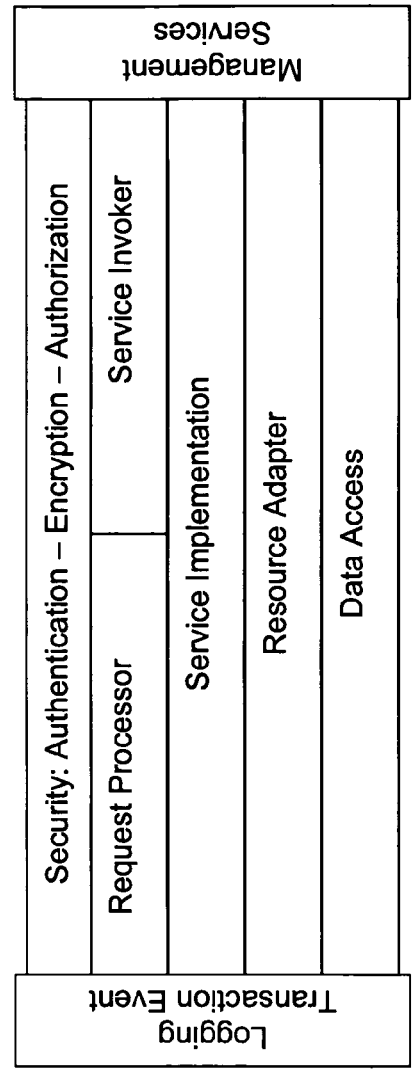
Figure 1B:
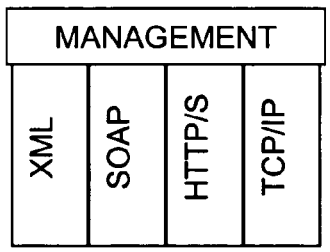

The invention provides a secure service network in which at least two participants having a relationship are connected to the network via secure service gateways and share information, data, payments, images, and the like located at one or more service providers within one or more service domains where a mutual trust relationship is established. Access to information is determined using trust relationships for high level domain partitioning and access control for low level authorization; in one embodiment, the trust relationships are established within or between and/or among domains upon the establishment of a root certificate of authority (CA), that signs one or more intermediate CAs, which in turns signs one or more subordinate CAs. This hierarchy supports one to one, one to many, and many to many participant domains and service definitions. The invention establishes a secure virtual service network (VSN) connection over any IP backbone which allows the sharing of information via services for a given service provider and requestor or domain of participants. The duration of the connection is user configurable and may range from indefinitely to the life of a given service request and its associated response. In an embodiment of the SSN, for a connection to be established, the requestor and service provider authenticate each other via a mutual SSL negotiation; if the authentication fails a connection will not be established. Once authentication is verified and a connection is established, authorization is enforced for that specific request based on data in the secure service gateway (SSG), global secure services gateway (GSSG), or a combination of the two. Alternately, in establishing a SSN connection, the requestor and service provider authenticate and authorize each other as part of a mutual SSL negotiation. The service is then executed. In one embodiment, authorization is determined by first determining that a requestor is listed in a global access control list (ACL) and then determining that the requester is listed in a local ACL, which may only further restrict the global access listing. Information is shared in real time, single transmission, bulk file or batch data transfer and may include verification, identity authentication, image exchange, network based image archiving. Network participants may typically include corporations, government entities, healthcare providers, manufacturers, retailers, utilities and their respective customers or clients. For example, a financial services embodiment is depicted in FIG. 1A wherein participants in an SSN include banks 4 and 7, clearing house 5, merchants 6, archive 1 and information exchange 2 and service provider 3. FIG. 1B depicts a secure service network stack and messaging architecture employing a standard web services protocol stack based on XML messages using SOAP over an HTTP transport. The services infrastructure includes message protocol stack, message specification, content, processing model, routing, exception handling, and integrated security and management functions providing management for XML, SOAP, HTTP/S, and TCP/IP. FIG. 1C depicts responsibilities of the secure service gateway which is logically portioned into subsystems: management services, logging (transaction event), security (authentication, encryption, authorization), request processor, service invoker, service implementation, resource adapter, and data access.

Figure 2:
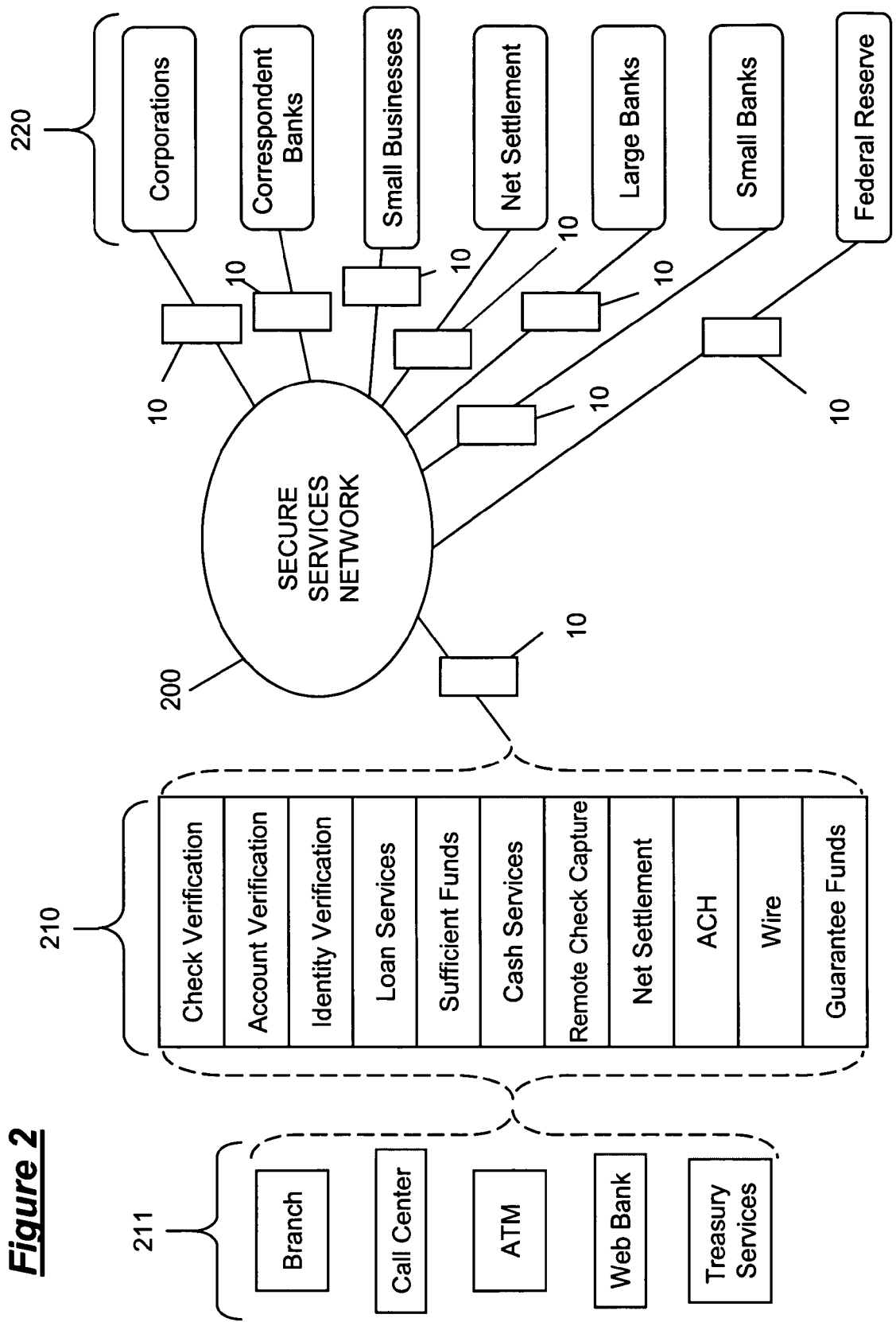
FIG. 2 is chart showing SSN information exchange and transaction functions and interactions in embodiment of the invention suitable for a financial institution.

In FIG. 2 an instance of SSN or a domain on a global SSN, IP connection 200, is used in an example where an institution's internal functions and data 210 are linked by the SSN to outside markets 220 as services and service domains through SSGS 10. Inside the bank nodes 210 include branch, call center, ATM, web bank, and treasury services, providing one or more of check verification, account verification, identity verification, loan services, sufficient funds, cash services, remote check capture, net settlement, ACH, wire, and guarantee funds. A SSN secure service gateway SSG 10 allows an institution to generate revenue from these assets by exposing existing and new business functions as pay for services to outside consumers 220, such as bank to bank, bank to corporate customer, bank to retail customer, bank to small business, bank to government, bank to others, etc. Secure, scalable, reliable and flexible digital information exchanges are created for markets such as corporations, correspondent banks, small business, net settlement, large banks, small banks, the Federal Reserve, etc.

Figure 3:
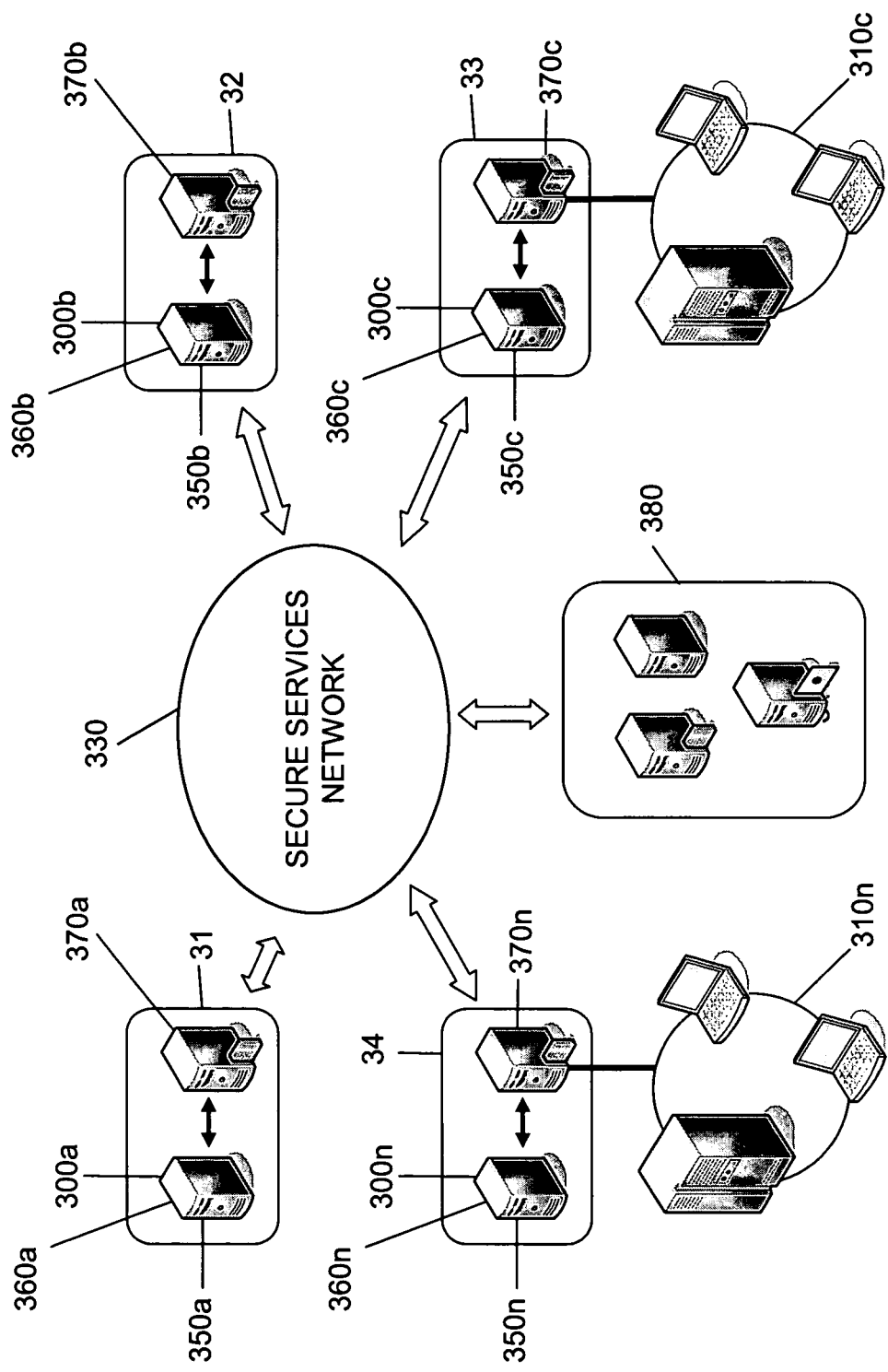
FIG. 3 is a diagram of a SSN showing security and service gateways (or nodes) and sub level networks.

More particularly, in the general embodiment shown in FIG. 3, SSGs 300*a*, 300*b*, 300*c* . . . 300*n* comprise a security proxy 360*a*, 360*b*, 360*c* . . . 360*n* and a services interface 350*a*, 350*b*, 350*c* . . . 350*n* allowing authentication and/or encryption providing authorization to services 370*a*, 370*b*, 370*c* . . . 370*n*. A log of all activities for a given SSG between service providers and service requestors is maintained at each SSG. A participant on the SSN 330 may be a requester, a service provider, or both through their SSG. Each SSG provides a request processor, a service invoker, a service implementation, a resource adapter, a data access layer and a security layer as functional elements. A message processed in the SSG includes at least (1) a unique name identifier assigned by a SSN to the services interface, (2) a request universal identifier that uniquely identifies a request from the SSG, and (3) a unique identifier for the participant originating the request. A policy between a requesting participant and a participant providing information may optionally determine a requesting participant's access to the provider's SSG and resulting service and data. In a financial systems embodiment, services such as check verification, account verification, identity verification, loan services, sufficient funds, cash services, remote check capture, net settlement, ACH, wire, and funds guarantee services are securely provided. A service on the SSN (1) confirms in real time, the existence of an account the instrument is drawn upon; (2) determines account status and owner; and (3) optionally, on one side, authorizes the transfer of the amount of the instrument for a subset of participants; and, (4) transfers and archives one or more image for clearing and settlement, thus achieving payment.

The global secure service gateway (GSSG) 380 interconnected in the SSN 300 of FIG. 3 includes, in addition to a global service proxy, (1) a directory of services available on the network, (2) a system-of-record to create and store information regarding participant connectivity; (3) a compilation of service statistics; (4) means for payment and verification; (5) means for document and or image exchange; (6) means for identity authentication; (7) a transaction audit and logging function; and (8) an activity billing function linked to the network. Within the SSN 330, a service domain may comprise an infinite set of services and participants providing information securely over an IP infrastructure to participants having a defined one to one, one to many, or many to many relationship. Administration and/or support functions, such as audit, record tracking and reporting, are part of the services infrastructure layer implemented by the SSG of a participant and one or more GSSGs in real time or for a given period of time.

As shown in FIG. 3, a SSN 330 includes SSGs 300*a* . . . 300*n* at each particpant's interface with the SSN and a GSSG 380, one or more service domains each with one or more services 370*a* . . . 370*n*, coupled with security, administration and support functions to provide information sharing, including information owned, information used, and information delivered. The characteristics of Information shared in the system is not limited and may be transferred in real time as a single transmission, in a bulk file transfer, or batch data transfer. In brief, the SSN is a network comprising two or more participants with one of the participants offering at least one service. Participants communicate with other participants, such as a group of participants communicating with a set of service providers and or requesters. Connectivity to the network of the system is established via the SSG located at each participant.

Figure 4:
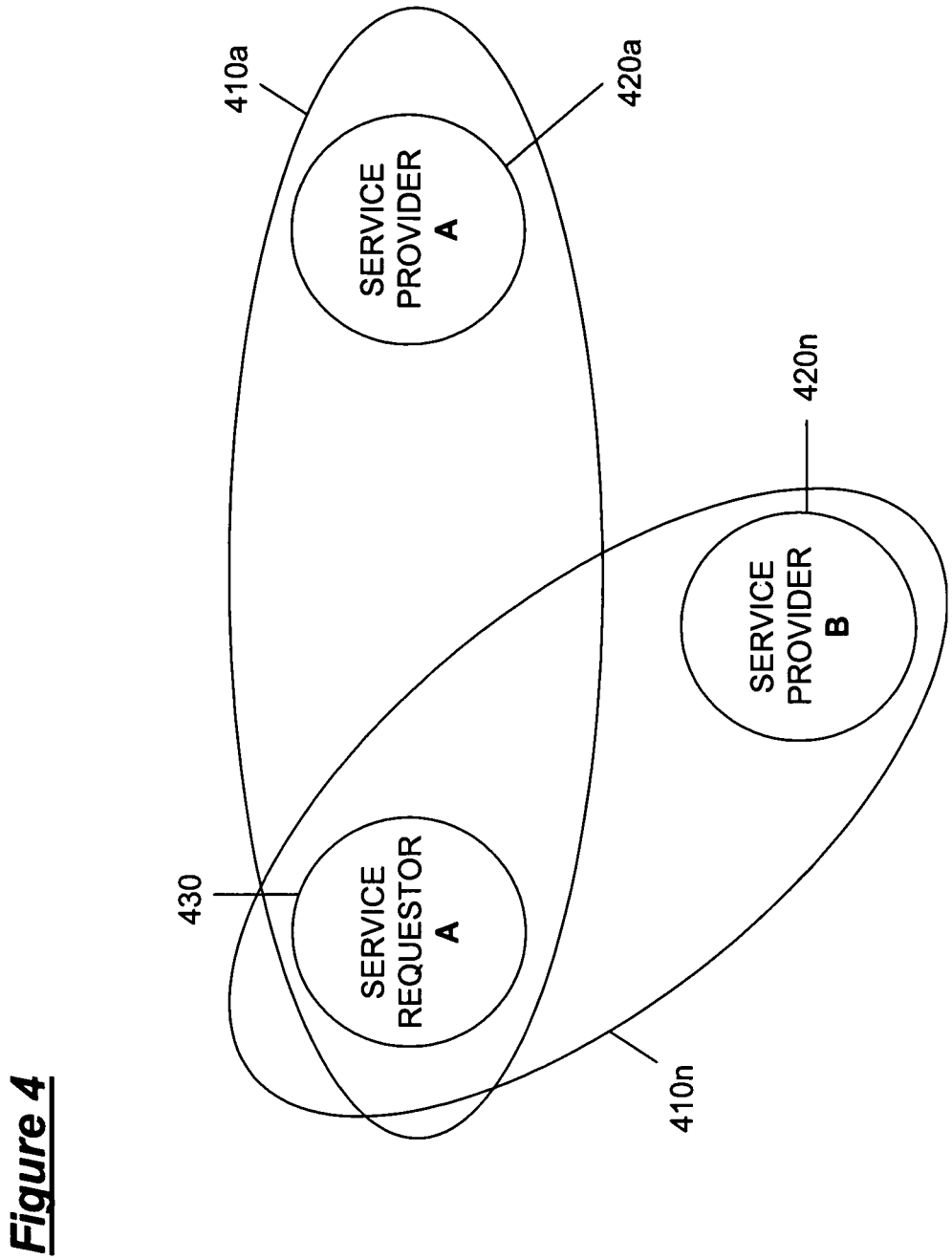
FIG. 4 is an example of a defined relationship in a SSN implementation.

As shown by the ellipses 410*a* . . . 410*n* in FIG. 4, parties, such as one or more participants providing a service ("provider") 420*a* . . . 420*n* that has a shared trust relationship with a participant requesting a service 430 ("requester") participate in the network. Multiple requestors such as 430 may be participants in the network. A requestor 430 may also be a provider such as 420*a* . . . 420*n* and vice versa. A provider 420 offers a service that is a business function to one or more requesters 430. As depicted by security umbrella 410, requestors must be explicitly authorized to access services; authorization can be managed locally and or centrally. In any case, the business function remains invisible to all other participants except to those that are authenticated and authorized to use the provider's service in the network. A participant optionally publishes the participant's public services offered in the domain of participants. A participant optionally publishes services specific to one or more requestors and/or domains. The participant restricts requestor access to services based upon a relationship, such as the security umbrella 410*a* . . . 410*n* between the participant and the requestor in the domain. As shown in FIG. 4, any participant service provider 420*a* . . . 420*n* creates a secured unique relationship 410*a* . . . 410*n* with one or more requestor 430. Participant service provider 420*a* is unaware of other providers 420*n* unless agreed to by the relationship it has with requestor 430.

In the example of FIG. 4, requestor A 430 can have a unique relationship with services provider A 420*a* and also have a unique relationship with service provider B 420*n*. Neither service provider is aware of the other unless agreed to by the relationship they have with the requestor; any service provider can have a unique relationship with one or more requestors, allowing services to be flexible, protecting unique relationships and cost models. For example, to service requestor A, service provider A may provide compartmented information, operational alerts and real time data feeds. Service provider B may, for example provide terrorist list verification, social security number verification, OFAC list, alerts, and other services. Sample requestors and providers in a government application include the FBI, local governments, Department of Homeland Security, DOE, NAS, INS, state authorities, and the like.

In a general outline, SSN general functions include service creation and domain administration through WDSL and objects, the distribution of WSDL and a family of infrastructure services, maintenance of a master ACL and ACL distribution, records of service runtime and domain administration, PKI certificate management, mutual SSL certificate authentication between requester and provider, a certificate revocation list service (CRL), message validation, XML schema support, administration of master and local ACL roles and privileges, and JCA based system-of-record integration.

SSN administration includes (1) service level reporting: administration services for local and global reporting, SLA enforcement, usage and billing functions, dispute resolution, real time status, utilization, and planning; (2) performance monitoring such as end to end audit, Hop level data for each major component, SNMP integration, JMX, proxy IDs to legacy systems for audit; and (3) security reporting and administration, including security proxy log roll up, certificate authority and key generation and distribution, certificate revocation list service (CRL). In the SSN administration, activity by gateway and domain includes service implementation, security proxy, management of all requests and responses, and ACL enforcement and response time by component. Global activity includes roll up of activity from each SSG and GSSG, and end to end reporting and billing. The SSN global secure service gateway (GSSG) administration includes discovery service participant enrollment and lookup, management of system-of-record connectivity and service statistics such as payment item verification, document/image exchange and identity authentication, transaction audit logging and activity billing.

SSN network security is provided by encryption and includes (1) network access and user authentication by mutual authentication, PKI infrastructure, and private key distribution; (2) service access authorization involving local and/or central ACL enforcement; (The data owner maintains complete control over access.) and (3) certificate revocation (CRL). The SSN also provides a pluggable framework to support XML certificates, DES, etc.

In one embodiment, adding a service through SSN governance, the parties agree on a standardized message. The message is defined by XML schema; WSDL is used to define the SOAP object to be exchanged; WSDL schema is distributed to the participants. Additionally, a JAVA object to be deployed in the reference platform is distributed. In the WSDL, authorization ACL information is distributed; the participant is responsible for approving who can access what service; the participant then loads the approved ACL in the security proxy. Management of the security proxy may be outsourced and/or performed remotely, consistent with requirements of a particular SSN implementation.

Figure 5:
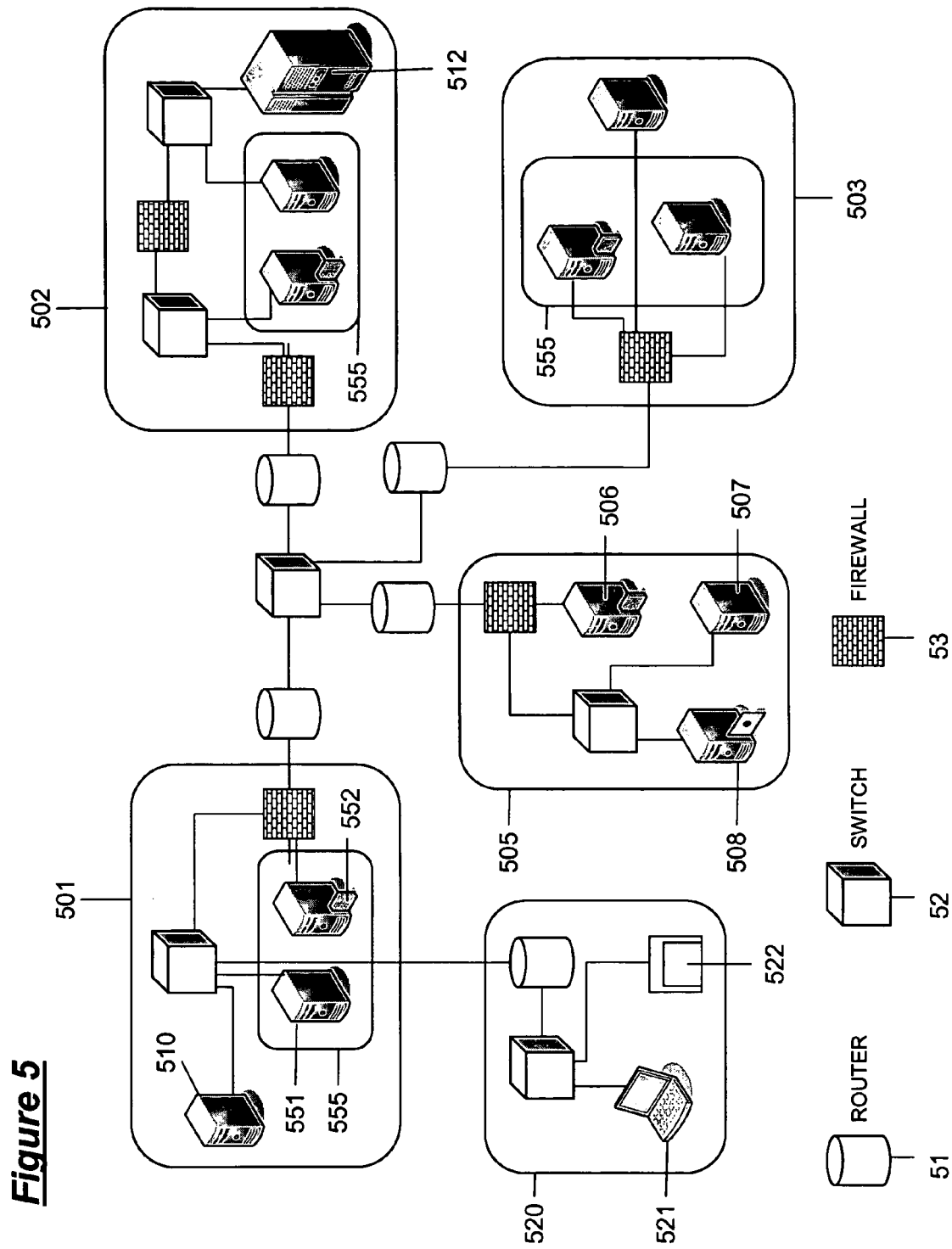
FIG. 5 is a diagram of an example of a financial services SSN linked in a system of the invention.

In the SSN shown in FIG. 5, as discussed in more detail below, the SSN leverages additional security provided at the network IP level by devices, such as routers 51, switches 52 and firewalls 53 (as shown by the legend accompanying the drawing) and other VPN devices, including combinations of hardware and software. The present invention centralizes the administration of various security devices and integrates policies across a network. The invention comprises role based security and control in a shared multi-function services network. Role-based security enforces authentication and authorization filters based on a participant's role, activity, and function in the SSN. The network includes one or more interconnected SSGs in the SSN. The SSGs, or integration nodes, comprise a security layer and a service interface at each network connection point. In FIG. 5, each SSG 555 is further connected to the participant's system of record (SOR) 510, 512 and 514. The SSG connects each participant to the network via an SSG that is logically partitioned into subsystems or layers. The subsystems comprise links, where the SSG infrastructure creates a log of each event and management services for all actions interacting with an SSG. This includes the SSG side as well as the integration side of the SSG into a participant's private network. The layers comprise security, request processor, service invoker, service implementation, resource adapter, data access, and HTTP/SSL proxy.

Security at the SSG includes authentication encryption and/or authorization. In one embodiment, ACL security is provided through one or more of Lightweight Directory Access Protocol (LDAP) over a SSL, SOAP using Hypertext Transfer Protocol (HTTP) exchanged over an SSL encrypted and mutually authenticated session (HTTPS), SOAP over HTTP, Java Remote Method Invocation (RMI), Internet Inter-ORB Protocol (IIOP), Java Database Connectivity (JDBC), and the like. The security layer performs an authorization look up in a directory before a participant is allowed access to the network and further access through a second participant's internal firewall to a second participant's SSG. The security infrastructure supports ID and directory management through PKI, digital certificates, and ACLs using Open DAP, LDAP and or SSL and Open SSL.

The request processor of the SSG authenticates the connecting participant and verifies that the participant is authorized to perform the given request. If verification succeeds, then the request processor locates a service associated with the specified URL, and allows the participant access to that service. The service invoker of the SSG leverages defined classes of participant authorization and access so that requestor access to data filtering is controlled. Hierarchal classes are configured to determine the processing chain. The resource adapter connects each node to the participant side of a network. The data access component of the SSG provides access to databases in the network upon authorization. The service implementation function of the SSG handles events from the participant's offered service while tracing support functions. A provider can establish a shared trust relationship with a requestor of the provider in the network. Requestors may also be providers and vice versa. The provider offers information or provides a transactional or business function to one or more requestor; requesters must be explicitly authorized to access services. The invention supports multiple governance models for secure communication and administration. The information or transactional or business function remains invisible except to those requestors that are authenticated and authorized to use the service in a domain on the SSN. The security portion of the SSGs and GSSGs establish a common infrastructure for security that is completely transparent to a service implementation on the network. This approach allows for consistent security while allowing the end participant to maintain complete control over the creation, definition, and secure distribution of a service to any and all participants. In FIG. 3, the network includes one or more GSSGs 380 connected to one or more SSGs 300a . . . 300n. The GSSG 380 provides effective network management for the participants by prioritizing functional applications and creates a secure legacy integration layer for legacy data. The GSSG comprises service creation, service runtime, message validation, and a Java Connector Architecture (JCA) based system-of-record interface. These functions include: (1) a directory of services to retrieve network service-related resource descriptions and to enroll participants and perform look-ups; (2) a system-of-record to create and store information regarding connectivity; (3) the compilation of service statistics, such as service status/notification, confirmation and completion statistics, trouble status notification, closure statistics and complaint status; (4) means for payment and verification; (5) means for document and/or image exchange; (6) means for identity authentication; (7) a transaction audit logging function; and (8) an activity billing function.

The SSN is a peer to peer secure service infrastructure that through implementation and administrative process supports a wide range of governance models. Examples include a strong central governance model as well as a distributed model, or a mix of both. This allows the benefits of full peer to peer network operation without relinquishing individual security control to a central governance authority and is accomplished via the unique SSN design and the fact that all services are layered on top of a distinct security infrastructure for service implementation. Security is thus part of the base infrastructure and therefore may be stated to be part of the network. The SSN (1) provides a common and consistent implementation that can be monitored and managed both centrally and locally; (2) supports an enterprise security framework without the requirement for the end user to proxy security for their data to some third party; (3) supports additional security at the service implementation layer if necessary; (4) removes the need for security in the application or service layer, reducing chances for error in development; and (5) provides a common implementation and enforcement that supports local as well as enterprise reporting and administration. Security is not required or unique to each service definition; security is incorporated in the overall service infrastructure and therefore becomes part of the network definition for all services instead of a individual service by individual service function.

Three of the many governance and administration models that the SSN can support are described below. The ability to support a wide range of governance and administration models by configurations and permutations of security characteristics in the SSG and GSSG is achieved.

Example I

Figure 7A:
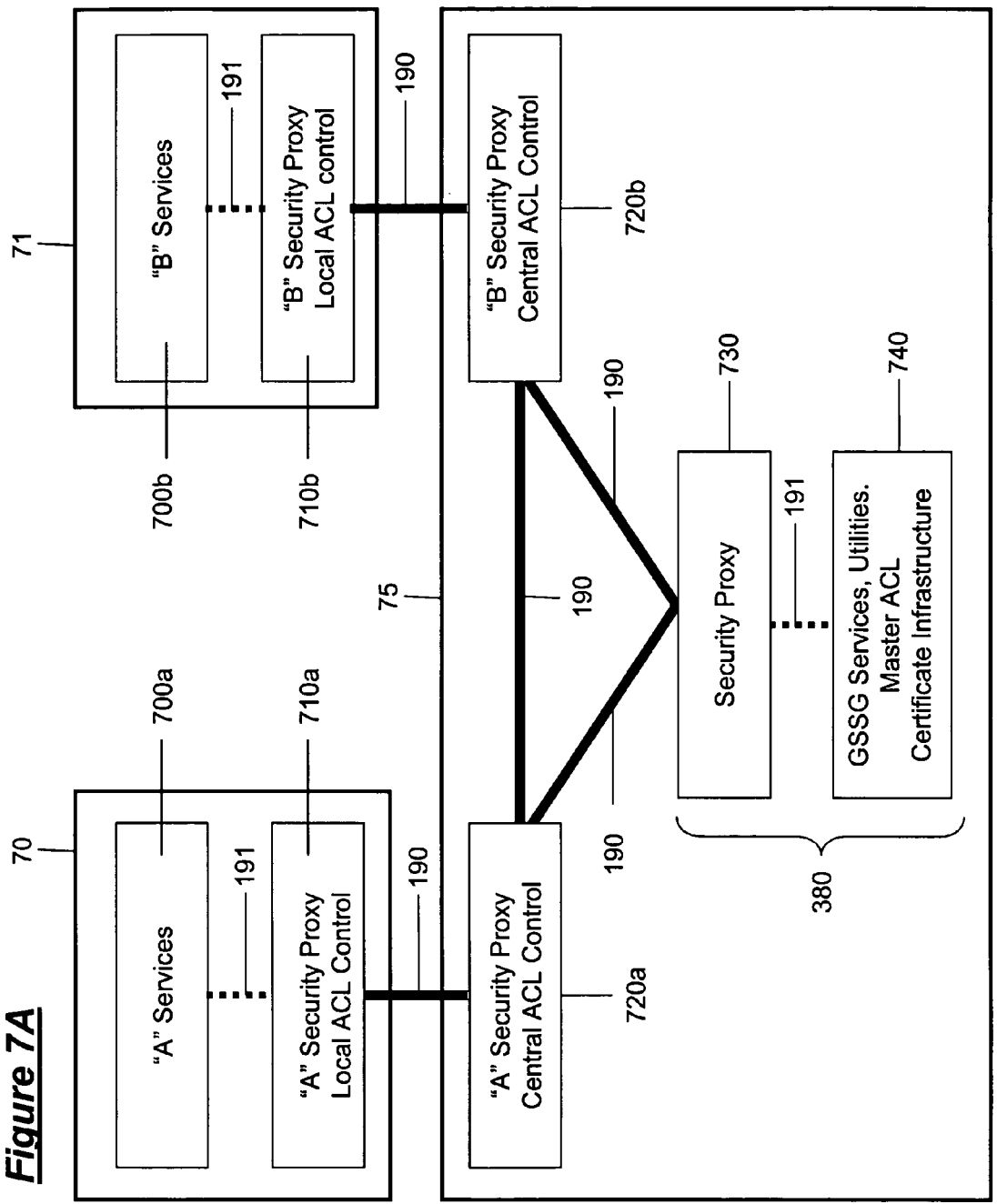
FIG. 7A shows the SSN supporting a hybrid governance model providing local data access controls with global enforcement. (In the bold connections shown at 190, the secure virtual service network connections that are established on a peer to peer basis; clear channel or open connections are shown by the dashed lines 191.)

Hybrid governance: Local service and data access control with global enforcement is shown in FIG. 7A. Participant nodes including service providers A 70 and service provider B 71, with service modules 700a and 700b, respectively connected through security proxy 710a and security proxy 710ba are under the control of the local node and user. At the GSSG level 75, correspondent security proxies 720a and 720b, and GSSG 380 including security module 730, with services utilities, master ACL and certificate infrastructure 740 are under central control and enforcement. This arrangement gives absolute local data access control to the service provider participant A 70 and service provider participant B 71 (i.e. local ACL management and enforcement) independent of the central body. In the bold connections shown at 190 between 710a and 720a, between 710b and 720b, between 720a and 720b, between 720a and 730, and between 720b and 730, secure virtual service network connections are established on a peer to peer basis. Clear channel or open connections are shown by the dashed lines 191 between 700a and 710a and between 700b and 710b. New services and domains can not be added without central provisioning. This ensures consistency and adherence to a loose overall governance model. To enforce this, there is a central check for authorization with an option local check. The local check assures that the central authority has not provided access to services that the local service provider does not also agree can be accessed by a specific user or user domain. This means that a check of local ACL and central ACL must be validated for a service to be used. This hybrid approach results in significant flexibility at the local level while enforcing standard implementation patterns and compliance with the infrastructure at the global level.

Example II

Figure 7B:
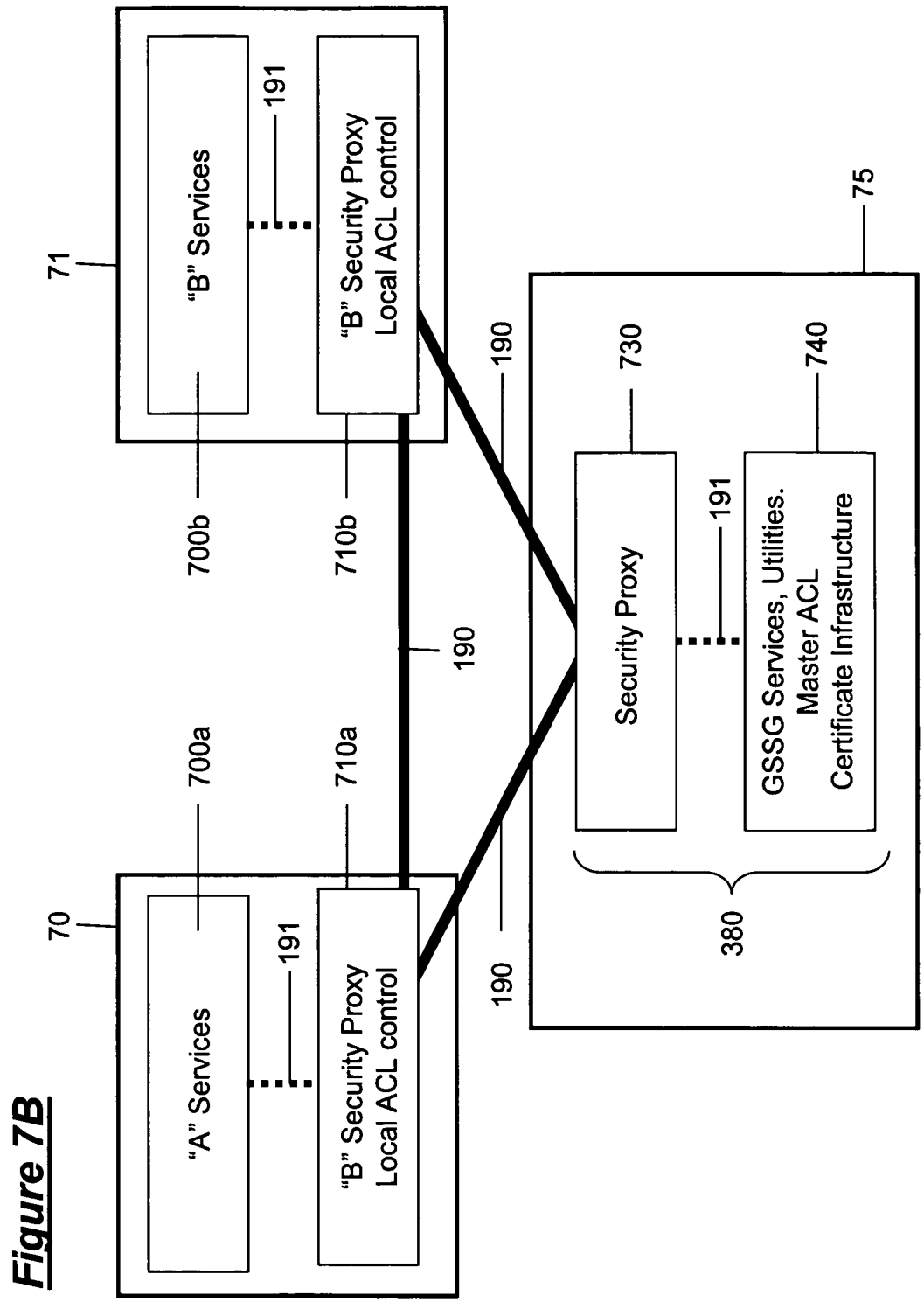
FIG. 7B shows an alternate SSN supporting a strong local or distributed governance model with central fail safe enforcement.

Strong local or distributed governance with central fail safe enforcement and local data access control with total local ACL enforcement is shown in FIG. 7B. Provider A 70 and provider B 71 are under local control. In this model, there is no central ACL enforcement; authorization is completely managed by the end participant. However, prior to authorization there must be mutual authentication which is controlled by the GSSG via certificate management. As such global control can still be enforced through certificate privileges and certificate Revocation as well as domain definitions. As in Example I, A and B functions, services implementation, 700a and 700b, and security proxy local ACL control, 720a and 720b, are under the control of the local node and security proxy central ACL control 730 and GSSG 740 are under central control by GSSG 380; however there is no corresponding proxy for A and B at the GSSG level 75. Secure 190 and clear channel 191 interconnections are shown by the respective lines. As a result, local users can publish services to the network without being provisioned in the central ACL assuming the domain exists. Domain enforcement and authentication are still managed centrally; thus, rouge users can be disabled if abuse is observed.

Example III

Figure 7C:
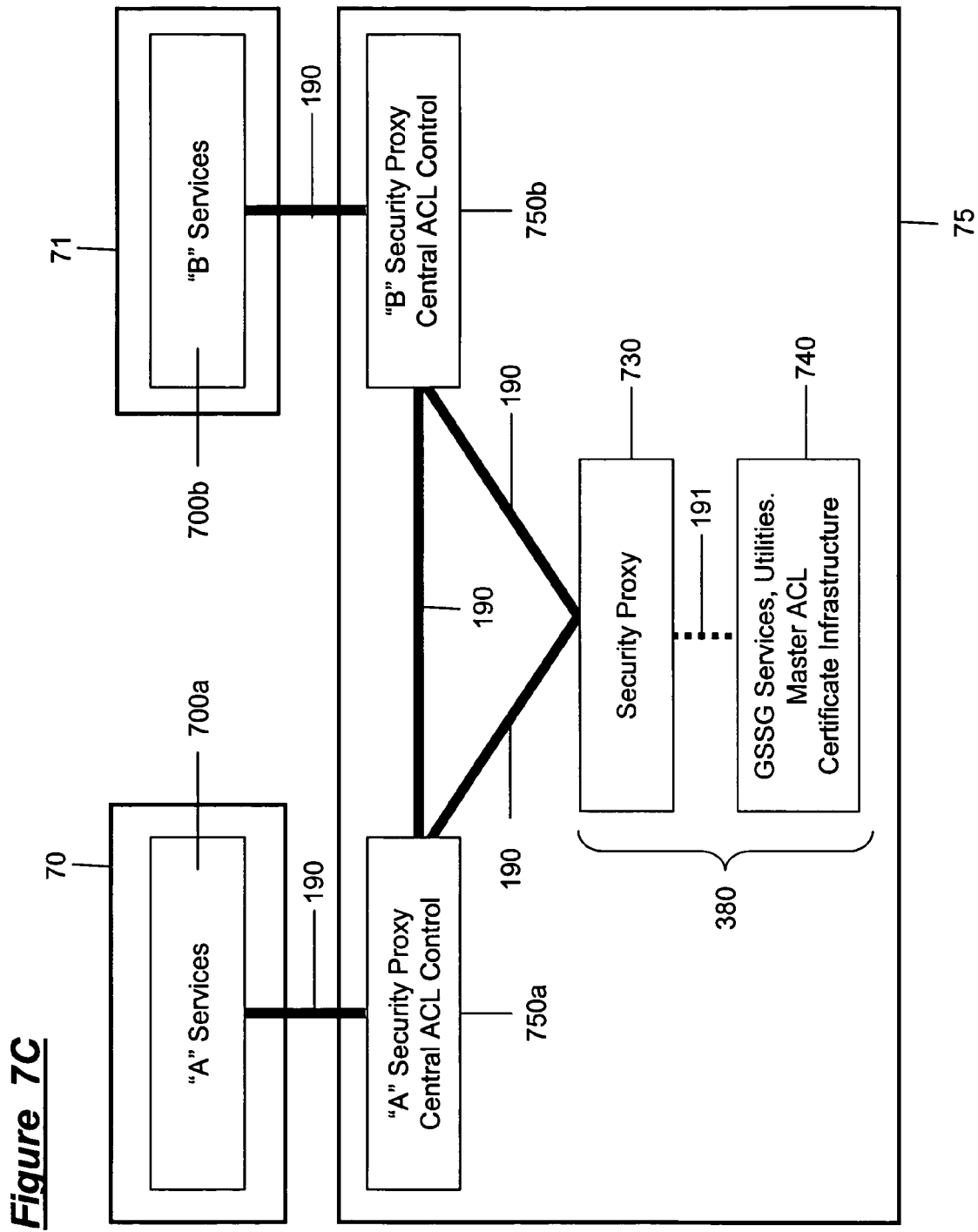
FIG. 7C shows another example of a SSN supporting a strong central governance and enforcement model with central service access control and global enforcement.

Strong central governance and enforcement with central service access control with global enforcement is shown in FIG. 7C. A 70 and B 71 services implementation, 700a and 700b, are under the control of the local node and user; security proxy 730 and central ACL control and other services 740 at level 75 are maintained at GSSG 380. Security proxy 730 and GSSG 740 are under central control. Secure 190 and clear channel 191 interconnections are shown by the respective lines. This embodiment provides little or no control to the end user except for the ability to create a new service and request provisioning from a central authority and assumes that authentication and authorization are managed and enforced centrally. Local security proxies are under central management and control. Local users can submit service and domains to a central authority for provisioning on the network.

GSSG includes security proxy service, and infrastructure functions and performs management and operations of the network such as the deployment service, support and billing. GSSG management features comprise participant enrollment and look-up, system-of-record connectivity, service statistics, transaction audit logging, activity billing, payment item verification, and document and image exchange. GSSG administration comprises service level reporting performance monitoring, open source based operating system, Java Management Extensions (JMX), Java management, and audit/logging management In an embodiment, the GSSG performs an end to end audit comprising Hop level data for each major component, simple network management protocol (SNMP) for the integration of the exchange of information, Java management extensions (JMX), and proxy ID's to legacy systems for auditing, logging, tracing, and tracking.

The present invention creates any number of participant service domains. In an embodiment, the network comprises multiple private service domains which allow a participant to supply unique services to specified markets, customers, suppliers, and classes or groups of participants. The system implements an infinite set of service domains securely over any IP infrastructure while providing diversified uses across a multitude of industries. The service domains support unique private relationships to include one to one, one to many, and many to many between and among participants. Relationships can be business to business, business to consumer, and consumer to consumer. Participants are aware only of participants in a specific service domain to which they are a member. Non-domain members cannot see other domains or domain traffic. End points can only see and interact with participants in a defined domain.

A service domain comprises one or multiple services. The SSN comprises means to add a service. In one embodiment of SSN governance, the parties connected in the network agree on a standardized message. The message is defined by XML schema. WSDL is used to define the SOAP object to be exchanged. WSDL and the schema are distributed to the participants. A Java object to be deployed in the SSG is distributed with the WSDL and schema.

In the example shown in FIG. 3, participants are linked to the SSN network 330 through SSGs 300a, 300b, 300c . . . 300n as nodes 30, 31, 31, 33 . . . in the network. The number of nodes connected to a network is not limited. Each SSG may optionally be linked to other networks either within or without the system. Each node optionally can support one or more sub-nodes such as 310 established on an intranet or other private network. Internal sub nodes or subnets, such as those related to human resources, legal, accounting, finance and the like, may similarly require security adapted to subnet functionality. Participants may be service providers and or service consumers, and may act both as participants on the network and members of one or more service domains. The participants may be similar or mixed markets and use the same or different applications all acting privately and securely on a common IP network infrastructure. A participant using the system may not necessarily be a human, since automated procedures and processing may be adapted in embodiments.

The system creates and protects IP packets in the network by defining a method of specifying the traffic to be protected, how that traffic is protected, and to whom the traffic is sent. Services messages are defined using WSDL. Message content typing is specified in an external XML schema definition with its own namespace. The schema definition is imported into the WSDL service definition. Message content is literal XML. XML content is schema based and therefore adaptable to many dialects. The service implementation supports the concepts of self describing interfaces where the SSG can be interrogated by a machine and acted upon easily without human intervention. Services optionally include one or more attachments in a manner consistent with World Wide Web Consortium's SOAP Messages with Attachments (SwA) specification. Such a practice allows compliance with the Web Services Interoperability Organization's basic profile recommendations.

All request and response messages contain at least three identifiers: (1) the unique name identifier assigned by the SSN to the SSG, such as created by the program DIGI-FI™ commercially offered by Synoran LLC, Columbus, Ohio; (2) a request universal identifier (RoUID) that uniquely identifies a request from a SSG; and (3) a point of origination universal identifier (PoUID) that represents a unique identifier for the originator of the request within a participant's internal network domain that is attached to a SSG which is attached to a domain on a SSN. When these three identifiers are contained in a message, they uniquely identify a request and response pair in the network. The existence of this information is also used for reporting, administration, security, billing, audit, attack tracking, failed attempts and the like across the entire SSN. Information logged and reported from each SSG can be rolled up and reported on at the GSSG. This allows for a global view of activities while maintaining privacy for all participants.

The services infrastructure comprises a message protocol stack, a message specification, content, a processing model, means for routing and exception handling, and at least one integrated security and management function. The protocol stack comprises messaging architecture employing a standard web services implementation. Messaging architecture employs a standard web services protocol stack based on XML messages in SOAP over an HTTP transport. Each participant's family of services is defined and created using WDSL and objects. In one embodiment authorization is left to each participant where the participant is a service provider on the SSN. In this case, the participant is responsible for approving who can access their individual services. This allows for each participant individually to control access to services without requiring a rigid service definition and implementation process that has to be agreed to by all participants. The embodiment allows each participant to create, develop and deploy a service independent of other participants on the network. In addition, each service provider is allowed to define domains and participant access to services the provider offers. Each participant then loads the approved ACL in its SSG; management of the SSG can be controlled in-house or outsourced. In one implementation, sessions during information sharing are managed with PKI certificates where a mutual SSL authentication is accomplished between a requestor and a participant service provider. The system provides for revocation of certificates through a CRL implementation. Hierarchical certificate management and ACL management is supported to allow flexible service and domain definitions on the same network. Thus, the invention provides true multifunction services on a common network infrastructure. There may be multiple domains, services and participants all on the same IP backbone. Messages are validated using XML schema support. In one implementation, master and/or local ACL's define participant's roles and or privileges. Enforcement can be based on the local, the master or a mix of ACL validation. Validation is accomplished via a confirmation that a given service requestor is allowed to access that service via defined privileges in one or more ACLs. The invention provides the ability to provide local ACL enforcement and control without introducing security risks to the other participants on the network.

The SSG and GSSG provide an integration layer to allow rapid integration to new or existing systems. This includes integration via common standards like JCA, Java Message Service (JMS), MQ, External Call Interface (ECI), Remote Method Invocation (RMI), JDBC, application program interface (API) and the like. Sample services include but are not limited to verification, identity authentication, image exchange, network based image archiving and retrieval, and remote image capture. Verification allows validation of information in real time, information and image processing, and insures reduced telecommunication costs, image compliance and quality assurance. The network provides for the exchanges of multiple types of images, which streamlines many processes.

To meet the need for privacy, the system supports literal data exchange as well as interpreted data exchange. For example, a check verification service may include a detailed look up of the account, the account owner, available funds, etc. However, due to privacy needs, the reply on the network may or may not include this detail. The reply may provide only a yes or no, a score, a level of confidence, etc. The system described herein thus protects the privacy of the account owner and meets the needs of privacy laws in some industries, but still conveys the critical information needed for the requestor to make a decision. In addition, a service can be defined for a given set of activities and the interpretation of that service can be specific to the requester and/or provider or the unique relationship of the participants.

Data and processing flow can be context specific where context definition is beyond the data in the message. It can be done in terms of the relationship between the provider and requestor and can be structured to fit the relationship to a domain and a given role in a domain or set of domains. The ability to define a service that is exposed to a community of users in the SSN that can be acted on differently from both a data and processing flow perspective is unique to the system. For example, a request from requestor A (a Bank) for a service provided by provider B may be interpreted differently in terms of data to provide a processing flow that differs from the same service request from requestor C (for example, a different bank or a car dealer) to provider B. This feature allows a service interpretation for a given request to be context specific where context requires more than the data in the request. The invention can be dependent on a relationship defined in at least two dimensions by using the domain option as well as the role option in the security layer of the SSN. This allows the processing chain on the service provider side to be flexible and requestor specific in responding to a request. It also allows the service fulfillment to be specific to the risk or cost associated with a specific service activity by leveraging other statistical data that allows for further interpretation of the data in the service or the relationship defined by the implementation and fulfillment of a service from a specific requester.

Identity authentication contributes value in a wide range of environments by establishing a participant's identity on the SSN and a service on the SSN where a requester can request an identity service. A service request can be made to confirm an identity based on data available to a community of participants on an SSN. This allows a participant to validate an identity based on data available from all service providers on an SSN or in a given SSN domain. An example could include verification of customer information against information on file at a customer's bank, the federal government, a state's bureau of motor vehicles, court records, etc. Once a participant or individual is authenticated, a rule can be enforced for that participant. This rule involves authorizing rights and privileges for a given request—typically involving limiting access to secure areas and or private information based on the rights of each participant in the network. Authenticating a participant's identity ensures qualification for access to a service and ensures a participant's privacy. A participant using the system for identity management authenticates the information in real time from one or many locations on the network that contain identity information. The system optionally creates new repositories for identity verification. Under the authentication function of the present invention, an XML record is utilized; the XML record is sufficiently flexible to handle a variety of network based identity solutions, including driver's license information, biometric capture, and data sharing.

Upon connecting to the system of the invention, a participant configures policies. Each participant in an SSN has a defined relationship with the SSN that can be unique to a domain, groups of domains, individual services, or groups of services.

Service domains are partitioned into domain hierarchies with inherited trust relationships. Domain partitioning is flexible. In one embodiment, trust relationships are determined via a hierarchy of certificate authorities (CA). To establish trust relationships, the network first creates a trusted root CA. Trust relationships in domains are determined by partitioning and using intermediate CAs, each of which is signed by the designated root CA. Each participant's digital certificate originating from its domain is signed by the intermediate CA. Access control is enforced via a hierarchy of service ACLs. Domain participants must be trusted with signed CAs to gain access to information in the SSN. All requesters must be authorized by the ACL, which may be applied to multiple services and multiple providers. Example IV describes the interactions of participants and service domains.

Example IV

Figure 6:
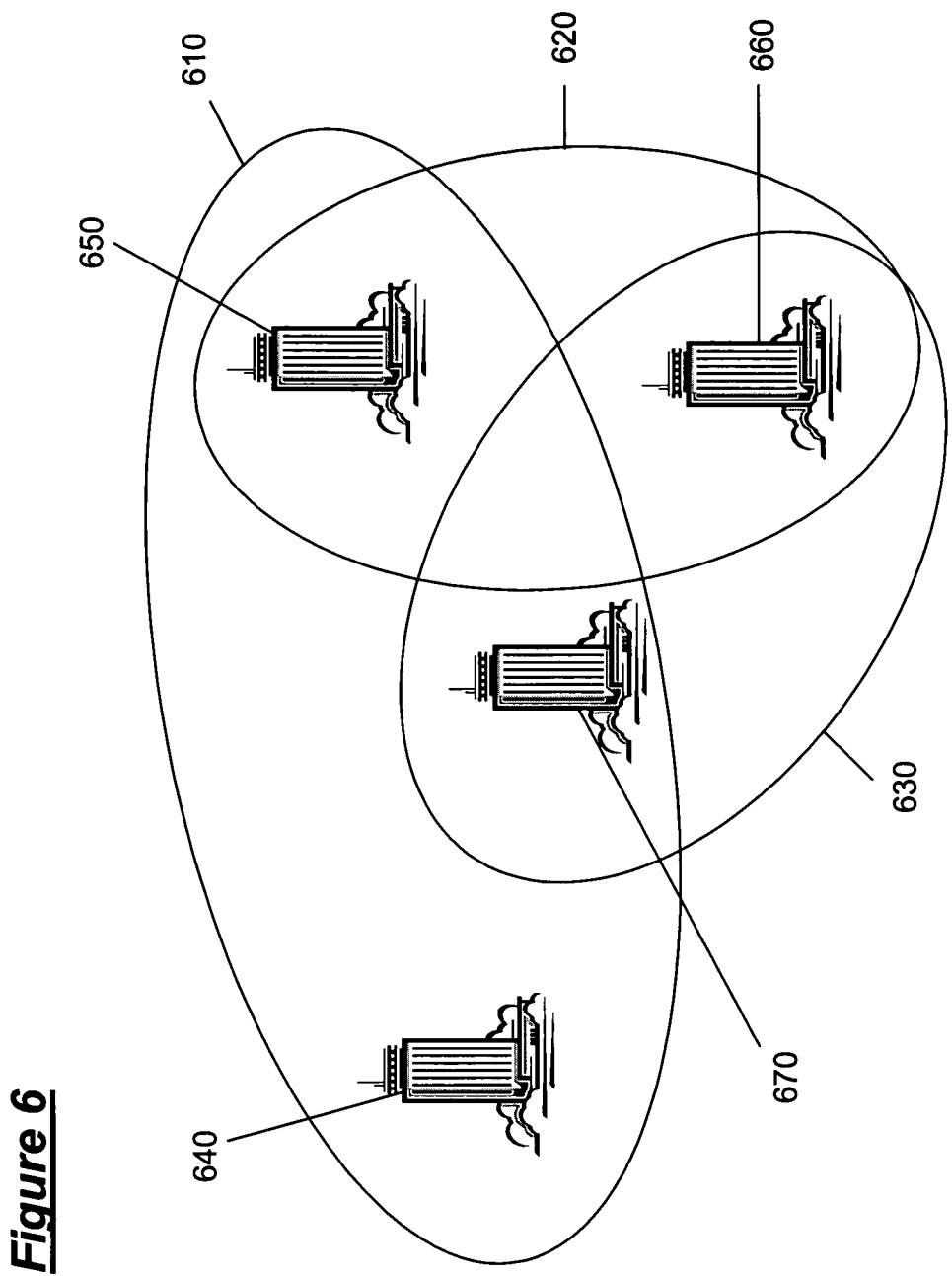
FIG. 6 shows interactions between and among SSN user and service domains.

As shown in FIG. 6, in domain 610, provider 650 has a trusted relationship and offers one or more service to requestor 640 and requestor 670. In domain 630, provider 660 has a trusted relationship with and offers one or more service to requestor 670. In domain 620, provider 650 has a trusted relationship with and offers one or more service to requester 660, which may be a different or the same service(s) offered to requestor 640 or requestor 670. Trust relationships among the participants are determined via a hierarchy of CAs. A root CA is created that signs all participant's certificates. In this example, an intermediate CA is created for domain 610, which is signed by the root CA. Domain 610 intermediate CA signs CAs for participants 640, 650, and 670. The trusted relationship between provider 650 and requestor 640 and requester 670 is established via the participant domain 610 and intermediate root CAs. Similarly, the intermediate CA for domain 630 is signed by the root CA for that domain. Domain 630 intermediate CA signs CAs for participants 670 and 660. The trust relationship between provider 660 and requestor 670 for one or more service is established via the participant domain 630 intermediate and root CAs for that domain. In domain 620, a domain 620 intermediate CA, signed by root CA signs CAs for participants 650 and 660. The trusted relationship between provider 650 and requester 660 for one or more service, which may differ from service(s) offered to requestor 640 and or requestor 670, is established via the participants, domain 620, and intermediate and root CAs for that domain. Access among the participants is determined by ACLs. The root CA signs all participants' certificates. In domain 610, provider 650 determines the authenticity of a requester 640 or 670 by comparing the requester to an ACL for the service for which provider 650 and requester 640 and requestor 670 have a relationship. In this example, requestor 640 and requestor 670 are listed on the ACL for the service requested. In domain 630, provider 660 determines the authenticity of a requester by comparing the requestor to an ACL for a particular service. Requestor 670 is listed on the ACL for a particular service, while participant 640 is not. In domain 620, provider 650 determines the authenticity of a requestor by comparing the requestor to an ACL for a service different from the service offered to requestor 670; requestor 660 is listed on the ACL for the different service; participant 670 is not.

In one embodiment, the SSN provides flexibility by combining trust and access control and uses trust relationships for high level domain partitioning and access control for low level partitioning. Access is managed in the invention through a combination of global and local controls. This provides the benefits of peer to peer network solutions without compromising security and governance. Global access is defined through business relationships and determined via service ACLs. With reference to the SSN shown in FIG. 3, global or central ACLs are stored in the GSSG 380 managed by the system. Local access is defined by providers in each business relationship and determined via service ACL's stored in each participant's SSG 300a . . . 300n in security modules 360a . . . 360n and managed locally and/or centrally depending on the desired governance model. Authorization is global, then local or any combination of the two. Requestors must be listed in the global ACL maintained in the GSSG 380 and the local ACLs maintained in SSGs 300a . . . 300n shown in modules 360a . . . 360n, to gain access to a provider's services 370a . . . 370n through interfaces 350a . . . 350n. A local ACL may optionally further restrict a global access listing in the GSSG and as a result provide the local service provider with absolute control of access to its services and data.

The invention is useful for multiple markets for applications, such as financial services, government, including homeland defense, national security, military theater, healthcare, manufacturing, retail, multiple B-to-B and B-to-C communities, business firms, large corporations with complex corporate structures, small businesses, suppliers, consumers, and the like. In an embodiment, the invention can be implemented for a single end user as a self-contained appliance such as a modem like interface to a network connection. Typically, the participant is a supplier selling services on a network based on an IP infrastructure. With the growing concerns about security and identity fraud, a SSN can be implemented at the single computer user for secure exchange of information on a one to one, one to many, or many to many basis. The supplier optionally provides organizational management to deliver sales, deployment and operational support. The supplier is optionally a commodity information or financial services supplier. In an embodiment, a supplier uses the system to implement SSNs in specified industries. The supplier's service optionally generates click revenue where end users pay by the use of each service. The service drives demand for the commodity and in turn increases volume and revenue for the supplier. Alternately, a supplier may generate revenue based on consumption, through a base fee plus a consumption charge, a flat fee, an in-kind service exchange, and the like. The ability to allow participants to define, build and deploy services in a secure manner but with complete freedom of business functionality is a benefit of the SSN, allowing a participant to easily introduce new services and user communities to support a rapid low cost expansion of business relationships. Service requestors can gain access to data on a use basis without the need for a large up front cost or investment. As such, the SSN enables a unique business model that has the flexibility of the Internet without specific drawbacks of prior art security and reliability deficiencies.

In financial services embodiment depicted in FIG. 1A and FIG. 2, participants include all types of financial institutions, merchants, consumers, compliance entities, and the like. FIG. 1A depicts the exchange of sensitive financial information in an SSN through intermediate SSGs 10 at each participant. Information is exchanged between nodes connected to the SSN, such as service providers shown as image archive 1, information exchange 2 and others 3, individual banks 4 and 7, clearing house 5, and merchant 6. "Bank" as used herein includes all types of financial institutions and financial service, payment providers; generally, any firm or institution initiating or participating in a financial transaction or payment process. Interactions include bank to bank; bank to a corporate customer; bank to a retail customer; bank to a small business; bank to a governmental entity; bank to others; and the like. Information shared may include check image, image replacement documents (IRDs) and MICR data in batch or real time mode.

In FIG. 2, an SSN or a domain on a global SSN 200 is used for financial services where an institution's inside functions 210 and operations divisions 211 are linked to outside markets 220 by being exposed as services and service domains within SSN. As shown in FIG. 2, outside market participants 220 include corporations, correspondent banks; small business, net settlement providers, large banks, small banks, and government entities, such as the Federal Reserve, the FBI, etc. To access services, the service provider must enable access by requestor or requester domain. This allows the requestor to gain access to new data sources with very little investment or no up front cost and it allows a service provider to expose new services that are unique differentiators in the market. Such services can be exposed and billed on a as used basis through reporting and administration available at the SSG and GSSG.

The SSG exposes the pre-existing business functions, for example, as shown in 210, of a participant as "pay for" services to outside consumers in categories, for example, identified at 220. Inside business functions of a participant, such as the bank depicted in FIG. 2, include but are not limited to check verification, account verification, identity verification, loan services, sufficient funds, cash services, remote check capture, net settlement, ACH, wire, and guarantee funds. As mentioned previously, a service does not have to return literal data for each request; an interpretation or variation of that data will protect customer privacy. In addition, the processing chain on the service provider side can be varied for the same service without changing the service from the perspective of the requestor. This provides a flexibility to support various billing and servicing models. An example may be a check verification service where a request is made to verify a check; the service provider may execute a different processing chain internally depending on the requestor and the amount of the check. In this fashion, the service provider has the ability to link the amount of processing determined, for example, by expense or level of effort that the provider is willing to incur with the risk or value of the transaction. This is unique to the invention in the context of a SSN. As an example, a low value check may require data only concerning the length of time the customer has been with the bank and data that the account is in good standing. One the other hand, for a high value check, the service provider may additionally verify that there are sufficient funds in the account to cover the check. Optionally, the service provider could even hold those funds. The ability to do this without changing the service implementation from the requestor's perspective is a powerful and unique function achieved by the SSN. Cost and value of a service provided may be individually tailored to risk tolerance.

FIG. 5 depicts a SSN financial services domain implementation. Participants, Bank A 501 and Bank B 502 and net settlement service provider 503, and a GSSG 555 provided with security proxy 506 and service interface 507 with management services module 508 are connected in an SSN domain by SSGs 555 form the SSN. A SSG may optionally have a sub-net such as with bank branches 520 which may optionally be accessed by a payment teller 521 or accessory 522, as depicted for Bank A in FIG. 5. The subnet may be an intranet or a single source. Each participant is protected by a firewall in the connection in addition to the security layer provided by SSN. Each SSG, intermediate the participant in the SSN comprises a security proxy and a service interface at each network connection point. Each SSG in the SSN domain is further connected to the participant's system of record: for Bank A, payment enterprise server 510; for Bank B, system of record server 512, and for net settlement provider, net settlement server 514. Bank A and Bank B securely share information which may optionally be obtained through sub-nodes to (1) verify an account, the identity of the check writer, and whether the account contains sufficient funds through payment teller; and (2) perform loan services, cash service; remote financial instrument capture, and the like. The net settlement provider depicted in FIG. 5 may be broadly defined as a treasury service. Bank A 500a and Bank B 500b interact with the treasury service from to effect electronic funds transfer, such as net settlement, payment and clearing, ACH transfers, wire transfers, and funds guarantee. ACH transfers may include direct deposit of payroll, social security, government benefits, tax refunds, direct payment of consumer bills such as mortgages, loans, utility bills, insurance premiums, business-to-business payments, e-checks, e-commerce payments, federal, state and local tax payments, and the like.

Using suitable variations of the bilateral trusted relationship security options, banks may verify financial instruments and a customer's identity, guarantee payments, and participate in Check 21, a law that facilitates check truncation by creating a secure substitute negotiable instrument, (IRD), thereby permitting banks to truncate original checks and process check information electronically. A participant using the system to verify a negotiable instrument, such as a check, 1) confirms, in real time, the existence of an account the instrument is drawn upon; 2) determines account owner and status; 3) optionally authorizes the transfer of the amount of the instrument for a subset of participants, such as "on-we" processing where banks mutually agreed to truncate financial instruments at the collecting bank. A participant using the system for Check 21 processing, transfers images of the financial instrument for clearing and settlement. Check fraud should be reduced by eliminating the time lag between check presentment, clearing and settlement. Thus, SSN services of the invention provide a unique and flexible mechanism to support straight through processing in financial services, providing significant business value to corporate customers by allowing a financial institution to offer services for remote check capture with real or near real time settlement and clearing. SSN provides the financial institution a low cost flexible, private, and secure mechanism to deliver this functionality to a wide range of customers. Traditional approaches of the prior art, in contrast, require a check specific network or a point to point dedicated network. SSN provides a peer to peer SSN that can perform a wide variety of functions that are exposed as services on the network.

Services in a financial embodiment include verification, identity authentication, truncated check image exchange, network based image archiving, and the like. Transaction verification allows validation of transaction information in real-time, such as (1) the ability to link demand deposit account (DDA) account information to teller and retail environments, (2) the ability to present commercial paper at tellers and retail points of presentment, and (3) the ability to streamline merchant/teller participation. In the financial embodiment, the SSN provides for the exchanges of multiple types of images, streamlining merchant participation in the truncation process; authentication prevents fraudulent payment transactions and identity theft while limiting access to secure areas and or private information.

In an embodiment where the participant is a governmental entity, the system is useful for: (1) compliance with national security specifications for homeland security, such as support for Regional Alliances for Infrastructure and Network Security (RAINS) and the Open Specification for Information Sharing (OSIS) as well as other emerging specifications through a family of secure web services that are easily integrated into existing legacy systems; (2) military uses, such as command and control and intelligence gathering, assessment, and dissemination; (3) sensitive compartmented information sharing and exchanges, such as intelligence and special operations; (4) local and regional government information uploads and sharing, including law enforcement and the Department of Homeland Security; and other government information and services.

Healthcare uses include: (1) patient safety, optionally adapted to biometrics, including patient verification and procedure and process verification; (2) device monitoring and remote monitoring; (3) substantiation of a controlled substance supply chain; (4) billing, payment, settlement, clearing, and facilitating insurance claims and payments; (5) access to patient records; (6) remote healthcare; and (7) image exchange.

Insurance industry uses may include: (1) claims reporting and updating, for use by customers, contractors, underwriters, etc.; (2) billing, payment, settlement and clearing; and (3) compliance issues.

In retail applications, the system is useful for: (1) point of presentment capture and end to end electronic check processing; and (2) acquirer services, including providing a single source solution for delivering merchant credit and debit card services such as a comprehensive authorization network for credit cards, debit cards and checks; (3) electronic data capture incorporating the capabilities of the retailer's authorization system combined with enhanced software, to enable an entire transmission to be electronically captured and value-added information to be transmitted; (4) Internet payment and processing services; (5) an accounting system to allow the retailer to record activities; (6) exception processing, including sales draft retrieval and charge back resolution; (7) fraud monitoring; (8) customized value added applications for retailers such as restaurants, lodging and direct marketers; and (9) identity verification.

Utilities, such as electricity, telephone, natural gas, and cable providers may use the system, inter alia, for: (1) local and regional information sharing between and among distribution facilities, generation facilities, suppliers, trading partners, consumers, and government regulators; (2) security; and (3) compliance.

Thus, the present invention optimally provides a secure transaction network for a defined space, such as a metropolitan area using a layered mechanism over existing infrastructure. In a metropolitan financial network, the SSN can provide transaction verification, identity authentication, image exchange, correspondent processing, "on-we" clearing, and settlement. An embodiment of a metropolitan transaction network comprises one or more service providers linked in an SSN to a SSG, to a GSSG, and to one or more of the participant's customers either via the customer's SSG or SSGs at each customer site. Each connection to the network is via an SSG comprising services, administration, and security functions. The GSSG further comprises a directory of the services in the network and a total SSN roll up point for those activities that an implementer may want to manage through central governance. The customer may be a single SSG or multiple SSGs further connected in a SSN or SSN domain.

There are many implementations of the SSG, ranging from large clustered hardware environments to an individual user with an appliance like device. For large high throughput applications, clustered servers are used to deliver scalability and redundancy. For the individual appliance, the user may install the SSG device as a card in a PC or server or as an add on box similar to a personal broad band router for DSL or cable broadband connectivity. As technology matures, miniaturization to a single chip implementation may occur. The base implementation supports SSN network interface(s) as well as internal user owned network interface(s). In addition to these SSN interfaces, several out of band communications options are supported for remote administration and security management and reporting for interfaces such as USB, Firewire, Ethernet, Gigabit Ethernet, and wireless.

Example V

Figure 8:
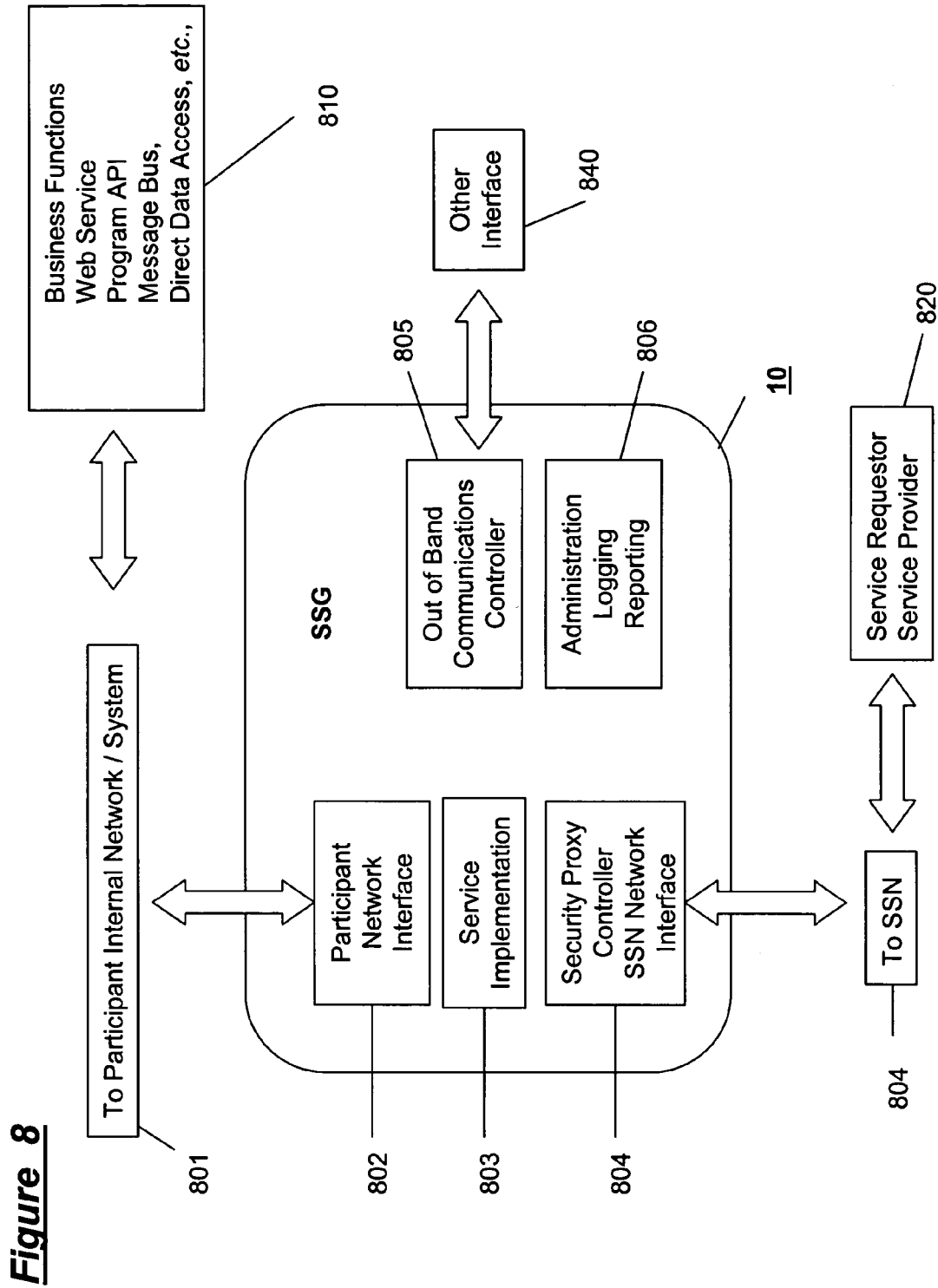
FIG. 8 shows a logical representation of network or communication interfaces to the SSG or GSSG, reflecting at least one SSN interface, one participant internal interface, and one out of band interface, isolated from the SSN network interface. The out of band interface is used for security and administration activities in support of the SSN.

SSG 10 is shown in FIG. 8 interconnected with a participant's internal network 801 and business functions 810. The SSG includes the participant's interface 802, service implementation 803, and security proxy controller and SSN network interface 804. Out of band communications controller 805 for use with other options 840 and administration module for logging and reporting 806 are included in the SSG. The SSG is optionally sized to suit the network and the participant. A low cost gateway is a POS single function endpoint to transact on the SSN comprising one CPU or appliance footprint with a reference platform technology stack. A small gateway for corporate access with full functionality is, for example, a two CPU footprint. An example of a medium gateway with significant throughput and high availability/failover is a six CPU footprint. A GSSG will likely require full high availability/failover archive components and extended storage. For example, a GSSG with large volume and high availability/failover is a 10 CPU footprint. Extended storage is required when substantial financial transaction histories and data are involved.

The system audits, tracks and reports, and is adaptable to private or public networks for any type of secure information exchange. The system comprises logging and reporting functions to support probing, authorization failures, request parameters, and the like. The reporting function includes both local and enterprise reporting; local reporting is performed at SSG; enterprise reporting occurs at any of the one or more GSSGs. Reporting supports determination of usage for billing purposes, requirements for service level agreements and governance, provides evidence in billing and dispute resolution, and the like. Reports are creatable in real time or over periods of time. Reports are useful for participant utilization and planning. The system provides for security reporting comprising a security log roll up, certificate of authority and key generation and distribution, and CRL's. Participant service usage is logged and reported based on each request and service provided. SSG and GSSG administrators can view transaction histories, errors, usage and other reports regarding the status and state of the SSN. Reports provide an end-to-end view of all the services involved in the integration, including those behind a participant's firewall. The system's reporting feature allows node and GSSG administrators to view and understand errors across the entire SSN. The system creates logs of activities by gateway and domain, service implementation, and security layer. Logs of the system include but are not limited to all requests and responses, all ACL enforcement, response time by component, global activities, such as roll up of activity from each SSG and GSSG, end to end reporting, and billing. Other functions include quality of service (QOS) support for determining throughput based upon transmission rates, check images, real time payments, digital documents, fraud data, shared services, and the like.

The physical and logical design of the SSN, SSG and GSSG is layered to provide both flexibility and enhanced security. All major security functions are performed at the security layer; as a result, the security infrastructure is inherently part of any service implementation on the network. In so doing, one has the ability to physically isolate portions of the architecture for enhanced security. For example, the security may be located in a DMZ while the service implementation is located on the internal trusted side of a user's internal network. Multiple security layers can be used in a chain to provide both local and central control points in the SSN implementation. Each of the layers can be physically located on one hardware platform or segmented across many. This provides for a level of fail over and isolation to enhance performance and security and supports implementation patterns ranging from a single small appliance to a large server farm. The ability to support IP based firewalls between major layers and components of the infrastructure allows for ease of integration to current networks as well as supporting additional security on top of the base service implementation security infrastructure.

Figure 9A:
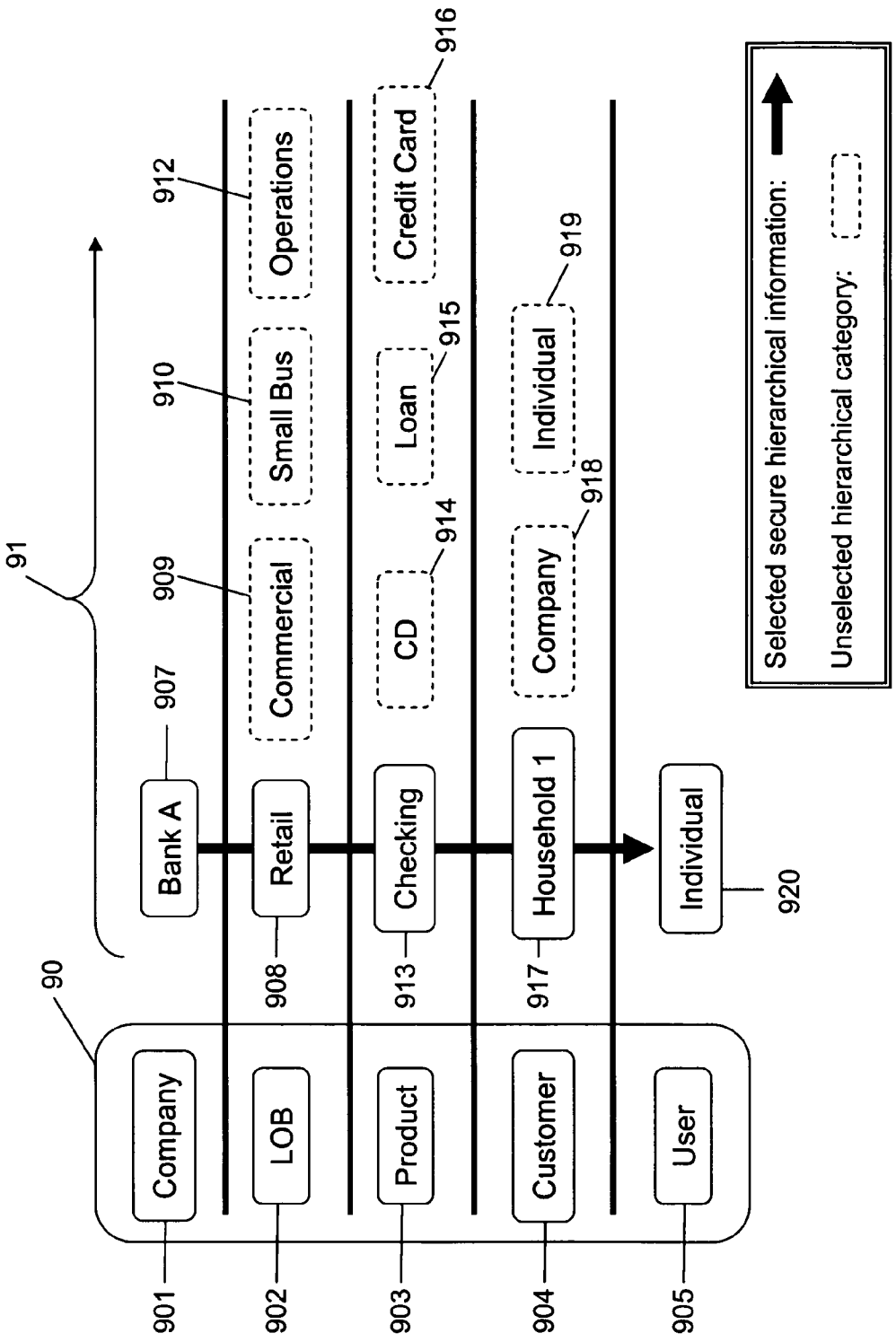
Figure 9B:
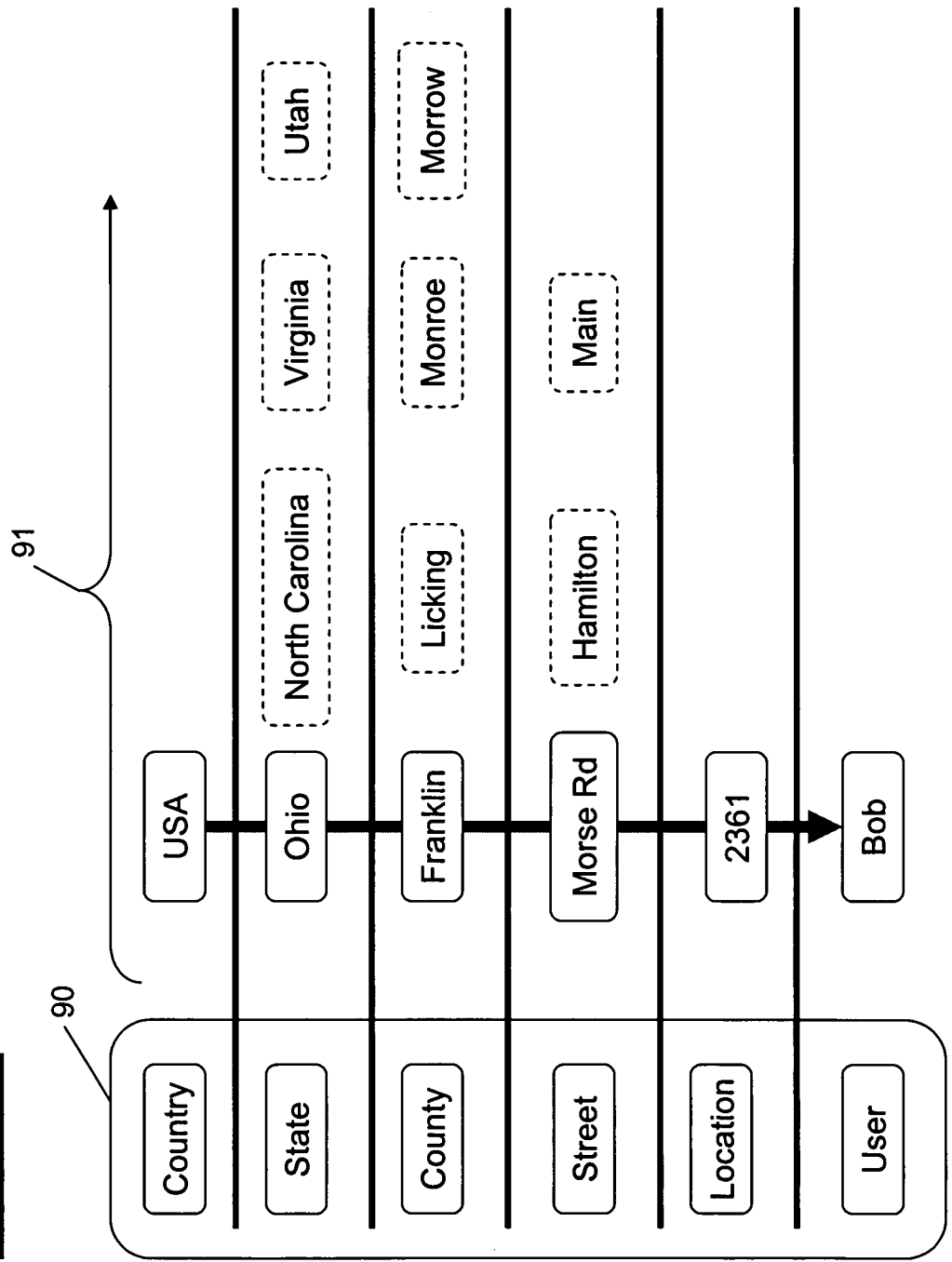

With reference to FIG. 9A, a template for examples of typical tree hierarchies also illustrated in FIG. 9B and FIG. 9C, the y-axis column 90 arranges users in general vertical categories of company 901, location of business 902, product 903, customer 904 and user 905. In turn, each vertical axis participant within the category is assigned narrower (or more specific) characteristics arranged in an x-axis branch (horizontal) 90, such as Bank A 907 in the company category where retail 908, commercial 909, small business 910, and operations 912 are also shown in the horizontal layer. The product hierarchy 903 includes accounts for checking 913, CDs 914, loans 915, and credit card 916. The customer hierarchy 904 includes categories of household 917, company 918 and individual 919. In the user category 905, an individual 920 is shown. Selected secure communications within and between hierarchical participants are shown in bold lines; unselected participants are in dashed blocks. In the sublevels, access may be finely tuned to an individual or locality, or any other individual or group of participants otherwise within the hierarchy as shown by the vertical arrows through the hierarchal levels FIG. 9B and FIG. 9C. Although a horizontal vertical hierarchy is shown in FIG. 9A, FIG. 9B and FIG. 9C, the representation is illustrative only, as any hierarchy or matrix of authorization and security levels may be defined in a SSN of the invention.

Figure 10:
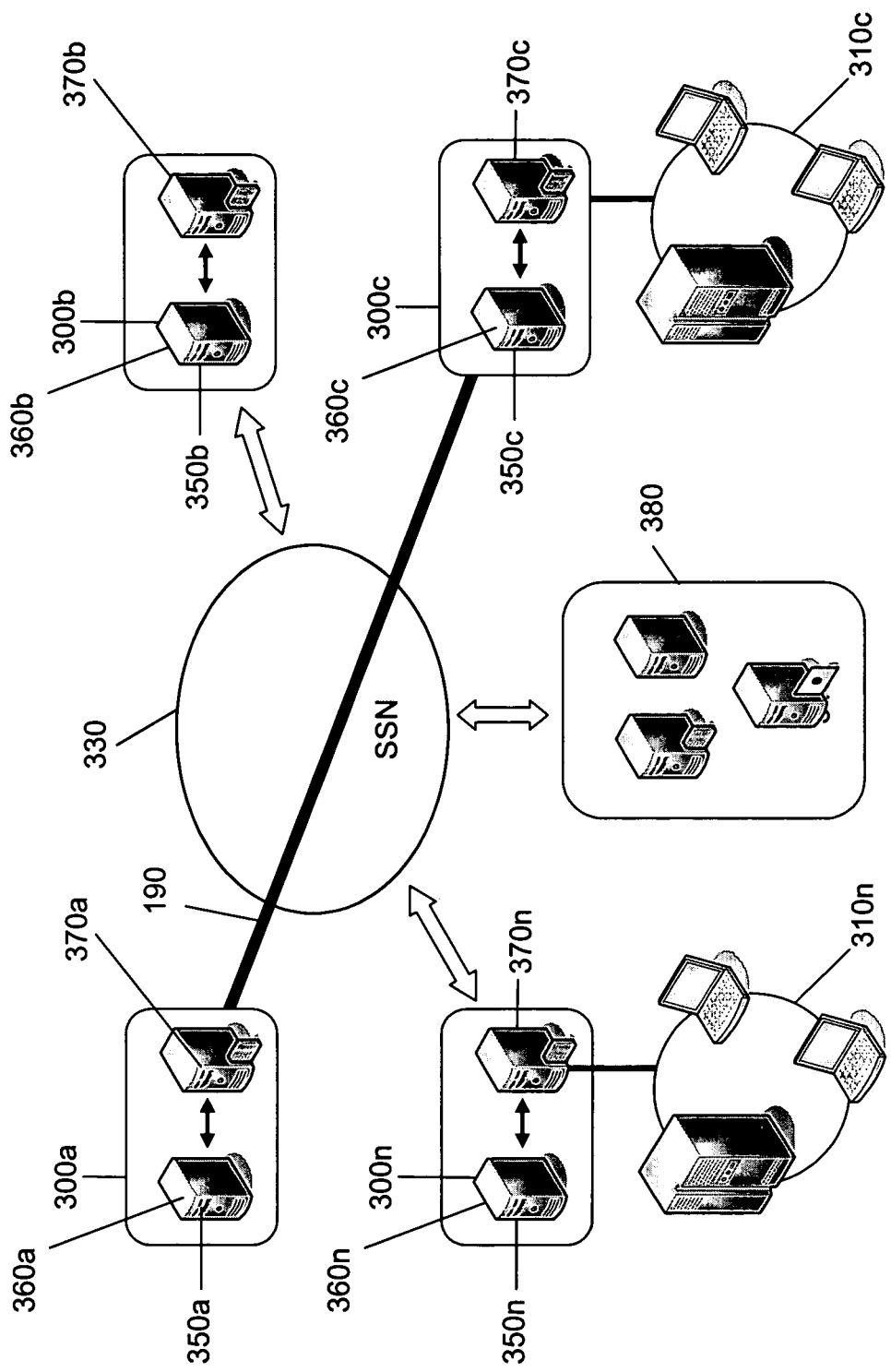
FIG. 10 depicts a bilateral connection at 190 between participants in a secure virtual service network connection that is established in an SSN implementation.
Figure 11:
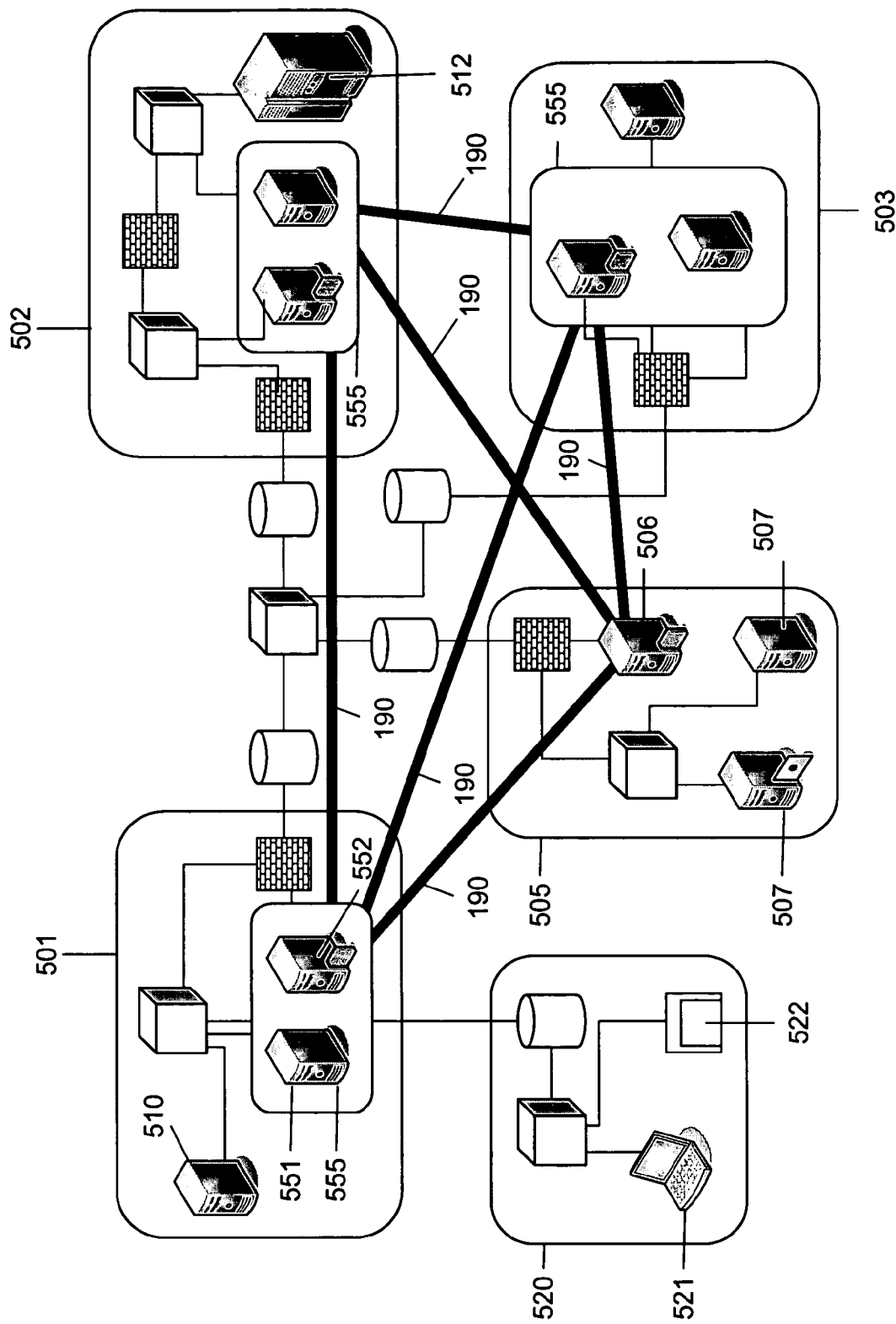
FIG. 11 depicts, in the bold connections shown at 190, the secure virtual service network connections that are established on a peer to peer basis over a physical IP infrastructure by the SSN. The secure connection is SSG to SSG independent of physical path. In one embodiment, the secure connection is established only following the successful negotiation of mutual authentication between SSGs using digital certificates signed by the certificate authority.

The SSG overall architecture supports in and out of band key distribution and management, and is adaptable to any PKI infrastructure where the ability to manage and distribute the private (secret) keys associated with the use of digital certificates is critical. FIG. 10 and FIG. 11 depict, in the bold connections shown at 190, the virtual secure service network connections that are established peer to peer over a physical IP infrastructure by the SSN. The secure connection is participant SSG to participant SSG independent of physical path. In almost every case, out of band distribution and management will be preferred for security reasons. Forms of distribution include: (1) distribution via secure web communication authentication and download, accomplished out of band of the SSN infrastructure by a log on to a secure web site where an additional credential is used to validate the download of a new private key; (2) via physical media; (3) telephone, cable or wireless home modem connection, authentication and download; or (4) distribution in band as part of a service on the SSN.

In an embodiment, every SSN service is first defined in standard Web Service Description Language (WSDL). SSN WSDL service definitions use XML Schema to describe message content. In general, any SSN service can be described completely by a series of XML files: (1) XML schema description of input and output messages; (2) WSDL binding describing service details; or (3) WSDL service endpoint description. The use of XML allows services to leverage a self describing data context permitting the system to machine interpret interfaces and services across the SSN. The security around each service is implemented in a separate layer of the SSG; however, security may be placed in a service if conditions so require.

Authorization can be managed centrally as well as locally. A local ACL can be more restrictive than the global ACL but can never enable privileges that are not in the global ACL for that requestor or service provider, unless the governance disables global ACL enforcement. This assures that all users are loosely governed by an overall governance authority but does not require that a user or data provider on the network trust the security that restricts access to their data to a third party. This unique feature, that supports loose governance, with absolute security, is an enabler unique to the SSN. Security is increased while the complexity of adding new services is reduced. Users can publish services at their discretion without the total agreement or consensus from all users or even a subset of users.

In another embodiment, authentication is managed via a secure public key infrastructure (PKI) that includes digital certificates. All users on the network have a certificate that is signed by a certificate definition in the master certificate authority. The master certificate authority includes a hierarchy that supports multiple domains for one or more signing authorities. As such, service domains can be established for any group of users deemed necessary. Only users defined as part of that service domain can connect with each other. Once connected, the combination of the mutual authentication and user roles as defined in the ACL for that requester and provider enforce what a requestor can see and what a provider will service. For a given request, the requester and provider must belong to a common domain as defined by a GSSG and/or SSG. To validate this bilateral association, the certificate for each participant (service requester and service provider) must be signed by the master certificate authority for that domain. When this is true, then a mutual authenticated secure session is established. Once the bilateral trust verification is complete, the provider authorizes against a local and/or master ACL to confirm the requestor is authorized to request that service. In one embodiment, the SSN certificate authority (CA) creates signed member certificates, and may revoke a member certificate at any time using a certificate revocation list (CRL). This functionality is managed by the GSSG and enforced at the GSSG and/or local SSG levels. Full SSL encryption is supported for all communications on the SSN. Other encryption approaches can be implemented through a plugable framework. In services requiring audit and nonrepudiation, multiple levels of logging are supported across all elements of the SSN, including all distributed SSGs and one or more GSSG.

The SSN allows a service provider to offer a service that may be comprised of data or functions from itself as well as services from other service providers with which it has a relationship. In this fashion, a service provide can provide a service offering that is an aggregation of services and/or data it has access to and/or consumes from other providers. In this manner, a service provider may become a service requestor as the result of a request it receives for a service that it provides. As a requestor it can provide access to services that the original requestor does not have access to or knowledge of. Aggregation is supported internal to one domain as well as across any domains that the service provider is a member of. As a result, a service provider can provide a broad range of services even if the provider only brokers data from other service providers. The ability to do this in a secure manner that requires no additional authentication or authorization from the original service requestor is unique to the SSN. In this manner, the SSN provides a level of transitive authentication and authorization that is not available today. The SSN provides authentication and authorization in a manner that is anonymous to the end requestor. This allows a service provider to broker other services without revealing to the original requestor his sources or business relationships. Full audit and logging for aggregation services are provided via the PoUID that is part of the core SSN. The PoUID identifies the point of origination of the original request and can be used to tie the logs together for all resulting requests to arrive at an end to end audit for the activity.

Having thus described the invention in detail, those skilled in the art will appreciate that, given the present disclosure modifications may be made to the invention without departing from the spirit of the inventive concept herein described. Therefore, it is not intended that the scope of the invention be limited to the specific and preferred embodiments illustrated and described. Rather it is intended that the scope of the invention be determined by the appended claims.

The invention claimed is:

1. A secure service network (SSN) in an existing network comprising:
   a security proxy for administering an authentication and encryption protocol to permit authorization allowing participants, sites and services to access the network,
   multiple security service gateways (SSGs) including layers comprising a request processor, a service invoker, a service implementation, a resource adapter, a data access link, and an HTTP/Secure Socket Layer (SSL) proxy intermediate the security proxy and the participant, wherein SSGs infrastructure creates a log of i: each event and management services for all actions interacting with SSGs, and
   a point of origination universal identifier (PoUID) for providing a unique identifier for the participant within the participant's internal network domain;
   an interconnection of SSGs within the SSN wherein interconnection is a precondition of participant access to the SSN by one network participant to another network participant, the interconnection creating a bilaterally secure peer to peer service connection; and
   security layers wherein a first participant providing, a service is connected to 1) a second participant providing a second service and 2) a requestor participant, each connected to the network through each participant's gateway, and the first participant providing a service enables the requestor participant to access information of the second participant providing a second service, the gateways administering at least one participant domain and service domain with access privileges for participants defined by the gateway for alt services, domains, mad participants on the secure network;

the secure service network further including:
- a global gateway for administering the secure network, wherein the global gateway comprises 1) a directory of services on the secure network, 2) a system-of-record to create and store information regarding participant connectivity; 3) a compilation of service statistics; 4) means for payment and verification; 5) means for document and/or image exchange; 6) means for identity authentication; 7) a transaction audit logging function; and 8) an activity billing function, and
- wherein each participant's access to a particular participant, site and service is determined in accordance with a hierarchical authorization system assigning each participant a predetermined level of access privileges predetermined in accordance the position within the hierarchy assigned by the gateway or global gateway to that participant; and
- wherein each participant's access to a particular participant, site or service is effected upon the particular participant's, site's or service's gateway receiving a message from the participant containing at least 1) a unique name identifier assigned to the participant, 2) a request identifier that uniquely identifies a request to the particular participant, site or service, and 3) a point of origination universal identifier for the participant originating the request, such that when these three identifiers are contained in the message, they uniquely identify a specific request and response pair in the network.

2. The secure network of claim 1 wherein access by each participant to the network through the gateway is effected by the gateway's acknowledgement of the identity of the participant on an access control list and a certificate of authentication management protocol;
and wherein 1) the authentication of each participant is performed by means of a mutual authentication based on a PKI certificate hierarchy managed by the global gateway, and 2) the gateways associated with all participants mutually authenticate each other as a prerequisite to authorization.

3. The network of claim 2 wherein private keys associated with the PKI are distributed in band and out of band.

4. The network of claim 2 wherein access is determined by first determining that the participant is listed in a global access control list and then determining that the participant is listed in a local access control list that overrides the global access listing.

5. The network of claim 1 wherein the first participant providing a service is a healthcare provider that allowed the requestor participant access to data at the second participant providing a second service, the services of the first and second participants aggregated by the network, the aggregated services including at least one of patient safety, biometrics, patient verification, procedure verification, device monitoring, substantiation of a controlled substance supply chain, billing claims, billing payments, access to patient records, and image exchange.

6. The network of claim 5 wherein the healthcare provider is allowed access in accordance with (a) an effort that the healthcare provider is willing to incur based upon the value of the aggregated services, and (b) an access policy, the access policy determining a fulfillment processing flow for the aggregated services.

7. The network of claim 6 wherein the aggregated services comprise a literal data response and an interpreted data response, the interpreted data response structured to protect the privacy of information.

8. The network of claim 5 further comprising 1) a directory of participants, sites and services, 2) a system-of-record data base to create and store information regarding participant connectivity; 3) parameters comprising statistics associated with participants, sites and services; 4) means for making a payment and verifying a transaction; 5) means for exchanging data; 6) means for tracking transactions and creating transaction logs for auditing; and 7) means for billing an activity.

9. The network of claim 1 wherein the service requested by the requestor participant may be fulfilled differently based on a level of risk associated with information derived or correlated to one or more data indicia contained in the service or one or more data indicia about the requestor participant requesting the service.

10. The network of claim 1 wherein authentication is performed through a PKI certificate hierarchy managed by each domain and wherein the participants mutually authenticate each other as a prerequisite to authorization.

11. The network of claim 10 wherein private keys associated with the PKI infrastructure are distributed in and out of band.

12. The network of claim 10 wherein the secure encrypted connection is established based on domain definitions in the PKI certificate hierarchy.

13. The network of claim 10 wherein the request for service is fulfilled upon participant authentication, and authorization is based on a combination of the PKI certificate hierarchy and an access control list hierarchy.

14. The network of claim 1 wherein the secure encrypted connection is established based on a combination of a PKI certificate hierarchy and an access control list hierarchy.

15. The network of claim 1 wherein, upon authorization of the participant, the participant is allowed access to a first service that is connected to a second service.

16. The network of claim 1, further comprising:
an appliance for providing a secure connection in the existing network, comprising:
a) a digital processor associated with the requestor participant and each participant, providing a service;
b) a data file repository in each digital processor that contains a point of origination universal identifier;
c) the digital processor interconnected with one of a local or global verification mechanism whereby the mechanism, upon a request to access one of a local or global mechanism, applies access criteria for the unique point of origination universal identifier associated with each participant in accordance with a defined hierarchy; and
d) a comparator within the digital processor and the mechanism such that, upon a correlation, the appliance connects the requestor participant to the first participant providing a service such that each has access to the appliance of the other at the level designated.

17. The network in accordance with claim 16 comprising a software program installed within a digital device.

18. The network in accordance with claim 16 comprising a software program embedded within a free standing digital device intermediate the interconnection to the digital processors.

* * * * *